(12) United States Patent
Sugiura et al.

(10) Patent No.: US 10,400,834 B2
(45) Date of Patent: Sep. 3, 2019

(54) OIL SUPPLY STRUCTURE FOR POWER UNIT, AND POWER UNIT

(71) Applicant: HONDA MOTOR CO., LTD., Tokyo (JP)

(72) Inventors: Hiroyuki Sugiura, Matsudo (JP); Noriyuki Suzuki, Saitama (JP); Kinya Mizuno, Asaka (JP); Yasushi Fujimoto, Asaka (JP)

(73) Assignee: HONDA MOTOR CO., LTD., Tokyo (JP)

( * ) Notice: Subject to any disclaimer, the term of this patent is extended or adjusted under 35 U.S.C. 154(b) by 484 days.

(21) Appl. No.: 15/122,224

(22) PCT Filed: Mar. 30, 2015

(86) PCT No.: PCT/JP2015/059864
§ 371 (c)(1),
(2) Date: Aug. 29, 2016

(87) PCT Pub. No.: WO2015/152130
PCT Pub. Date: Oct. 8, 2015

(65) Prior Publication Data
US 2016/0369853 A1    Dec. 22, 2016

(30) Foreign Application Priority Data

Mar. 31, 2014 (JP) .................................. 2014-073681
Mar. 31, 2014 (JP) .................................. 2014-073882

(51) Int. Cl.
*F16D 48/02* (2006.01)
*F01M 11/00* (2006.01)
(Continued)

(52) U.S. Cl.
CPC ................ *F16D 48/02* (2013.01); *F01M 1/02* (2013.01); *F01M 1/10* (2013.01); *F01M 1/18* (2013.01);
(Continued)

(58) Field of Classification Search
CPC ............. F16D 48/02; F16D 2048/0233; F16D 2048/0236; F16D 2048/0242;
(Continued)

(56) References Cited

U.S. PATENT DOCUMENTS

2002/0003064 A1   1/2002  Ito et al.
2009/0247361 A1*  10/2009 Maehara ............. F16D 48/0206
                                                            477/155
(Continued)

FOREIGN PATENT DOCUMENTS

JP    63-126647 U1   8/1988
JP    1-122728 A     5/1989
(Continued)

OTHER PUBLICATIONS

European Search Report application No. 15772488.1 dated Oct. 18, 2017.
(Continued)

*Primary Examiner* — Richard M Lorence
(74) *Attorney, Agent, or Firm* — Squire Patton Boggs (US) LLP

(57) ABSTRACT

An oil supply structure for a power unit includes a working oil pump, a lubrication oil pump, an oil storage section, a working oil pressure detection part and a lubrication hydraulic pressure detection part, the oil storage section including a lubrication oil storage chamber in which a suction section of the lubrication oil pump is opened, and a working oil storage chamber in which a suction section of the working oil pump is opened, and oil overflowed from the working oil
(Continued)

storage chamber being stored in the lubrication oil storage chamber.

13 Claims, 21 Drawing Sheets

(51) Int. Cl.
*F16H 57/04* (2010.01)
*F01M 1/02* (2006.01)
*F01M 1/10* (2006.01)
*F01M 1/18* (2006.01)
*F16D 25/12* (2006.01)
*F16H 61/12* (2010.01)
*F01M 1/12* (2006.01)
*F16H 59/68* (2006.01)

(52) U.S. Cl.
CPC ........... *F01M 11/00* (2013.01); *F16D 25/123* (2013.01); *F16D 25/14* (2013.01); *F16H 57/04* (2013.01); *F16H 57/042* (2013.01); *F16H 57/0404* (2013.01); *F16H 57/045* (2013.01); *F16H 57/0423* (2013.01); *F16H 57/0435* (2013.01); *F16H 57/0436* (2013.01); *F16H 57/0484* (2013.01); *F16H 61/12* (2013.01); *F01M 2001/123* (2013.01); *F01M 2001/126* (2013.01); *F01M 2011/0037* (2013.01); *F16D 2048/0242* (2013.01); *F16H 2059/683* (2013.01); *F16H 2061/1208* (2013.01); *F16H 2061/1216* (2013.01)

(58) Field of Classification Search
CPC ........ F16D 25/123; F16D 25/14; F16H 57/04; F16H 57/042; F16H 57/0423; F16H 57/0434; F16H 57/0435; F16H 57/0436; F16H 57/045; F16H 57/0453; F01M 1/02; F01M 1/12; F01M 2001/123; F01M 1/18; F01M 1/20; F01M 11/00; F01M 11/0004; F01M 2011/0037

See application file for complete search history.

(56) References Cited

U.S. PATENT DOCUMENTS

2010/0229824 A1* 9/2010 Matsuo ................... F01M 1/02
  123/196 R
2010/0307883 A1   12/2010 Patzner et al.
2013/0333980 A1   12/2013 Tsunashima et al.

FOREIGN PATENT DOCUMENTS

| JP | 03-024354 A    | 2/1991  |
|----|----------------|---------|
| JP | 05-209674 A    | 8/1993  |
| JP | 6-42624 A      | 2/1994  |
| JP | 06-288466 A    | 10/1994 |
| JP | 7-23854 U      | 5/1995  |
| JP | 10-267113 A    | 10/1998 |
| JP | 2003-166630 A  | 6/2003  |
| JP | 2005-30326 A   | 2/2005  |
| JP | 2009-517613 A  | 4/2009  |
| JP | 2010-255840 A  | 11/2010 |
| JP | 2012-107733 A  | 6/2012  |
| JP | 2013-257018 A  | 12/2013 |

OTHER PUBLICATIONS

International Search Report & Written Opinion dated Jun. 30, 2015 corresponding to International Patent Application No. PCT/JP2015/059864 and English translation thereof.
Japanese Office Action Notice of Reasons for Rejection application No. 2014-073681 dated Jun. 13, 2017.
Japanese Notice of Allowance application No. 2014-073882 dated Aug. 8, 2017.

* cited by examiner

OIL SUPPLY STRUCTURE FOR POWER UNIT, AND POWER UNIT

TECHNICAL FIELD

The present invention relates to an oil supply structure for a power unit in which an engine and a transmission are integrated.

In addition, the present invention relates to a power unit including a scavenging pump configured to pump oil from a specified space in a power unit case to a separate area.

Priority is claimed on Japanese Patent Application No. 2014-073681, filed on Mar. 31, 2014, and Japanese Patent Application No. 2014-073882, filed on Mar. 31, 2014, the contents of which are incorporated herein by reference.

BACKGROUND ART

As a driving unit of a vehicle, a power unit in which an engine and a transmission are integrated is used. In such a power unit, in addition to the engine and the transmission, a hydraulic clutch configured to cut off and connect power between the engine and the transmission, a working oil supply system configured to supply oil into the hydraulic clutch, a lubrication oil supply system configured to lubricate sliding parts of the engine or the transmission using the oil, or the like, is installed in a power unit case (for example, see Patent Document 1).

FIG. 17 is a view schematically showing a structure of an oil supply system of a general power unit.

Further, reference numeral 201 in FIG. 17 is a crank shaft of an engine E, reference numeral 202 is a main shaft of a transmission M, and reference numerals 203A and 203B are hydraulic clutches disposed at a shaft end of the main shaft 202 and configured to perform a cutting and connecting of power between the engine E and the transmission M.

The power unit shown in FIG. 17 has an oil storage section 205 formed at a bottom section of a power unit case 204, and a working oil pump 206 and a lubrication oil pump 207 that are installed above the oil storage section 205. The working oil pump 206 is configured to supply oil into the hydraulic clutches 203A and 203B. The lubrication oil pump 207 is configured to supply oil into the sliding parts of the engine E, the transmission M, or the like. The working oil pump 206 and the lubrication oil pump 207 have suction sections opened in the oil storage section 205 via a strainer 208, and ejection sides connected to a working oil passage 209 and a lubrication oil passage 210. The working oil passage 209 is connected to hydraulic pressure introduction parts of the hydraulic clutches 203A and 203B, and the oil discharged from the hydraulic clutches 203A and 203B is returned to the oil storage section 205 through a predetermined passage. In addition, the oil supplied into the lubrication oil passage 210 is returned to the oil storage section 205 after lubricating the sliding parts of the engine E, the transmission M, or the like.

In the middle of the working oil passage 209 and the lubrication oil passage 210 of the power unit, relief valves R1 and R2 and oil filters F1 and F2 are individually interposed, and hydraulic pressure detection parts S1 and S2 configured to detect a decrease in pressure of the oil in the oil passages 209 and 210 to a predetermined value or less and output an alarm signal are installed. A controller that receives the alarm signals from the hydraulic pressure detection parts S1 and S2 prompts an alarm to supplement oil to a user by, for example, lighting an alarm lamp in a display panel.

In addition, a power unit in which an engine and a transmission are integrated is used as a driving unit of a vehicle. As such a power unit, a structure configured to pump oil flowing into a specified space section in a power unit case into an oil storage section using a scavenging pump is known (for example, see Patent Document 2).

In the power unit disclosed in Patent Document 2, the inside of the power unit case is partitioned into a low liquid surface chamber (a specified space) in which a liquid surface height of oil is to be lowered and an oil storage section configured to store oil, and the scavenging pump is installed at a position lower than that of the liquid surface height of the oil storage chamber.

A suction passage extending upward from the low liquid surface chamber is connected to a suction section of the scavenging pump, and a strainer is connected to a suction port of the suction passage facing the inside of the low liquid surface chamber. In addition, a shaft part of the scavenging pump is constituted as a common shaft with a shaft part of a lubrication oil pump close thereto, and an end portion of the shaft part is immersed in oil in the oil storage section.

PRIOR ART DOCUMENTS

Patent Documents

Patent Document 1: Japanese Unexamined Patent Application, First Publication No. 2010-255840
Patent Document 2: Japanese Unexamined Patent Application, First Publication No. 2013-257018

SUMMARY OF INVENTION

Problems to be Solved by the Invention

In the above-mentioned general power unit, a working oil supply system and a lubrication oil supply system pump oil from the single oil storage section 205 through a common suction section (the strainer 208). For this reason, alarming timings due to a decrease in flow rate of the oil easily approach each other in the working oil supply system and the lubrication oil supply system. Here, when the flow rate of the oil in the power unit is decreased, it is required to prompt a user to supplement oil as soon as possible while securing a working oil pressure of the hydraulic clutches 203A and 203B. However, in order to satisfy the requirements, it is required to prevent early pressure loss in the working oil passage 209 upon the decrease in flow rate of the oil in the power unit.

Specifically, in the case of the general power unit, as shown in an enlarged view of FIG. 18, throttling sections A1 and A2 are set at several places in the middle of the working oil passage 209, and the hydraulic pressure detection part S2 of the lubrication oil passage 210 side is configured to output an alarm signal earlier than a hydraulic pressure detection part S1 of the working oil passage 209 side by finely adjusting specifications of the throttling sections, or the like. For this reason, in the related art, setting or tuning of the specification of the working oil passage 209 is difficult.

An aspect of the present invention is directed to provide an oil supply structure for a power unit capable of causing a hydraulic pressure detection part of a lubrication oil supply system to output an alarm signal early upon a decrease in flow rate of oil while facilitating setting or tuning of specifications of a working oil passage.

In addition, in the case of the above-mentioned power unit, while oil is pumped from the inside of a low liquid surface chamber into the oil storage section during driving of a scavenging pump, when the operation of the scavenging pump is stopped for a long time, reversal of the oil in the oil storage section into the low liquid surface chamber is a concern. Reversal of the oil is considered as a flow of oil of a high level into the oil storage section into the low liquid surface chamber through a suction passage which continues to the scavenging pump via a peripheral region of a shaft section of the scavenging pump disposed at a position lower than the oil. Then, when the oil is reversed into the low liquid surface chamber upon stoppage of the scavenging pump in this way, inconvenience of requiring a time of lowering a level of the oil in the low liquid surface chamber upon the restart of the scavenging pump occurs.

Another aspect of the present invention is directed to provide a power unit capable of suppressing a backflow of oil into a low liquid surface chamber from an oil storage section even when a scavenging pump is stopped for a long period of time.

Means for Solving the Problems

In order to solve the above-mentioned problems and achieve the aforementioned objects, the present invention employs the following aspects.

(1) An oil supply structure for a power unit according to an aspect of the present invention includes: an engine; a transmission configured to change an output of the engine; a hydraulic clutch interposed between the engine and the transmission, and configured to cut off and connect power between the engine and the transmission; a working oil passage configured to supply oil into the hydraulic clutch; a working oil pump configured to pump oil into the working oil passage; a lubrication oil passage configured to lubricate movable parts in a power unit case; a lubrication oil pump configured to pump oil into the lubrication oil passage; an oil storage section configured to store oil returned from the working oil passage and the lubrication oil passage and pumped from the working oil pump and the lubrication oil pump; a working oil pressure detection part configured to detect a decrease in pressure of the oil in the working oil passage to a predetermined value or less and output an alarm signal; and a lubrication hydraulic pressure detection part configured to detect a decrease in pressure to of the oil in the lubrication oil passage a predetermined value or less and output an alarm signal, wherein the oil storage section comprises a lubrication oil storage chamber in which a suction section of the lubrication oil pump is opened, and a working oil storage chamber in which a suction section of the working oil pump is opened, and wherein oil overflowed from the working oil storage chamber is stored in the lubrication oil storage chamber.

Accordingly, the oil returned into the working oil storage chamber in the power unit case fills the working oil storage chamber, and then the oil overflowed from the working oil storage chamber flows into the lubrication oil storage chamber. For this reason, storage of the oil in the power unit case is performed first at the working oil storage chamber side, and a liquid surface of the oil in the working oil storage chamber is easily maintained to always be at a level higher than a liquid surface of the oil in the lubrication oil storage chamber. Accordingly, when the flow rate of the oil in the power unit case is reduced, the pressure of the lubrication oil passage side is decreased earlier than the working oil passage side, and the lubrication hydraulic pressure detection part outputs the alarm signal early.

(2) In the aspect of (1), a hydraulic pressure regulation apparatus configured to regulate a pressure of oil supplied into the hydraulic clutch may be interposed in the working oil passage; the hydraulic pressure regulation apparatus may have an oil introduction port into which the oil pumped from the working oil pump is introduced, a control port configured to supply the oil regulated to a set hydraulic pressure to the hydraulic clutch, and a drain port configured to discharge excessive oil introduced into the oil introduction port; and the oil discharged from the drain port may be returned to the working oil storage chamber.

In this case, during normal traveling or the like of a vehicle in which operations of the hydraulic clutches are not frequently performed, excessive oil discharged from the drain port of the hydraulic pressure regulation apparatus in large quantities is returned to the working oil storage chamber. For this reason, during normal traveling or the like of the vehicle, a large amount of oil is returned to the working oil storage chamber, and a liquid surface in the working oil storage chamber can be maintained at a high level.

(3) In the aspect of (1) or (2), a transition passage configured to cause some of the oil supplied into the lubrication oil passage from the lubrication oil pump to flow into the working oil storage chamber may be formed at the lubrication oil passage.

In this case, some of the oil supplied into the lubrication oil passage normally flows into the working oil storage chamber through the transition passage. For this reason, the liquid surface in the working oil storage chamber is easily maintained at a high level.

(4) In the aspect of (3), a lubrication oil filter configured to purify oil may be interposed in a middle of the lubrication oil passage, and the transition passage may be provided downstream from the lubrication oil filter of the lubrication oil passage.

In this case, oil attenuated through the lubrication oil filter (59) in the lubrication oil passage is returned to the working oil storage chamber through the transition passage. For this reason, agitation of the oil in an inflow section of the oil from the transition passage can be suppressed.

That is, since the oil in the vicinity of an ejection section of the lubrication oil pump has relatively high ejection pressure and also a high pulse pressure, when the oil is returned to the working oil storage chamber through the transition passage directly, agitation of the oil in the inflow section of the oil easily occurs. However, the agitation can be suppressed by disposing the transition passage at a downstream side of the lubrication oil filter.

(5) In the aspect of any one of (1) to (4), the lubrication oil pump and the working oil pump may share a driving system and may be coaxially provided in the working oil storage chamber, and the suction section of the lubrication oil pump may pass through a wall of the working oil storage chamber to be opened in the lubrication oil storage chamber.

In this case, since the lubrication oil pump and the working oil pump share the driving system and are coaxially provided, both of the oil pumps are integrated in a compact size. In addition, the suction section of the lubrication oil pump passes through the wall of the working oil storage chamber to be opened in the lubrication oil storage chamber. For this reason, in the lubrication oil pump disposed in the working oil storage chamber, the oil in the lubrication oil storage chamber can be suctioned.

(6) In the aspect of any one of (1) to (5), the working oil storage chamber may be configured of a space that is substantially closed and having an upper wall, and a through-hole through which the oil filled in the working oil storage chamber overflows into the lubrication oil storage chamber may be formed in the upper wall of the working oil storage chamber.

In this case, the working oil storage chamber is configured of the space that is substantially closed and having the upper wall. For this reason, even when the power unit is inclined or the like, the oil in the working oil storage chamber does not overflow at a time. In addition, as a shape of the upper wall of the working oil storage chamber or a height position of the through-hole is selected, a maximum liquid surface height of the working oil storage chamber can be easily set.

(7) In the aspect of any one of (1) to (6), a liquid surface switch configured to emit an alarm signal when a liquid surface height of the oil in the working oil storage chamber becomes lower than a predetermined level may be installed in the working oil storage chamber.

In this case, when a flow rate of the oil in the power unit case is reduced, a reduction in flow rate can be known early by not only the lubrication hydraulic pressure detection part of the lubrication oil passage or the working oil pressure detection part of the working oil passage, but also a detection of lowering of the liquid surface of the working oil storage chamber by the liquid surface switch.

(8) In the aspect of (1), the oil supply structure for a power unit may further include: a low liquid surface chamber installed to be partitioned with the oil storage section in the power unit case; a scavenging pump disposed in the oil storage section and configured to suction oil in the low liquid surface chamber into a separate portion in the power unit case; and a suction passage having a suction port disposed at a first end side of the suction passage and opened in the low liquid surface chamber, and a second end of the suction passage connected to a suction section of the scavenging pump, wherein a shaft section of the scavenging pump is disposed at a position higher than the suction port of the suction passage and lower than a liquid surface height of oil in contact with an inside of the oil storage section, and wherein the suction passage has a bent section disposed above a liquid surface height of the oil in the oil storage section, the suction port is formed at a first end side of the bent section, and the suction section of the scavenging pump is connected to a second end side of the bent section.

Accordingly, when the scavenging pump is driven, the oil of the low liquid surface chamber in the power unit case is suctioned into the scavenging pump through the suction passage, and ejected to a separate portion in the power unit case from the scavenging pump. Here, since a suction force of the scavenging pump is applied to the suction passage, the oil is introduced into the scavenging pump through the bent section. Meanwhile, when the driving of the scavenging pump is stopped, the oil in the oil storage section tries to intrude into the scavenging pump through a periphery of the shaft section of the scavenging pump disposed at a position lower than the oil storage section. However, since the bent section disposed above the liquid surface height of the oil in the oil storage section is formed at the suction passage connected to the suction section of the scavenging pump, it is difficult for the oil in the scavenging pump to climb over the bent section of the suction passage to flow into the low liquid surface chamber.

(9) In the aspect of (8), the hydraulic clutch configured to perform cutting off and connection of power to a crank shaft of the engine under the crank shaft may be disposed in the power unit case, and a clutch chamber may be formed by partitioning a periphery of the hydraulic clutch as the oil storage section; and the clutch chamber may be the low liquid surface chamber.

In this case, even when the hydraulic clutch should be disposed in the power unit case at a low position, since the oil in the clutch chamber is suctioned out into the oil storage section by the scavenging pump, a rising of the liquid surface of the oil in the clutch chamber can be suppressed. Accordingly, an increase in rotational resistance by the oil upon a starting or operating of the hydraulic clutch can be suppressed. In addition, since a backflow of the oil from the oil storage section into the low liquid surface chamber upon stoppage of the scavenging pump cannot easily occur, the hydraulic clutch being immersed in the oil upon the starting of the engine can be suppressed to the utmost. Accordingly, the startability of the engine can be increased.

(10) In the aspect of (9), the working oil storage chamber may store oil to operate the hydraulic clutch, the lubrication oil storage chamber may be an oil storage chamber different from the working oil storage chamber, the scavenging pump and the working oil pump configured to pump oil to operate the hydraulic clutch may share a driving system and may be coaxially provided in the working oil storage chamber, and the scavenging pump may cause the oil suctioned from the inside of the clutch chamber to flow into the lubrication oil storage chamber.

In this case, the scavenging pump and the working oil pump share the driving system to be coaxially provided in the working oil storage chamber. For this reason, the scavenging pump and the working oil pump can be compactly disposed in the power unit case. In addition, the oil suctioned from the low liquid surface chamber by the scavenging pump flows into the lubrication oil storage chamber separate from the working oil storage chamber without directly flowing into the working oil storage chamber. For this reason, agitation of the oil in the working oil storage chamber can be prevented. That is, ejection of the oil from the scavenging pump may cause agitation of the oil in the inflow section due to involution or the like of air because the liquid surface level of the oil in the low liquid surface chamber is lowered. However, in the power unit, since the oil ejected from the scavenging pump does not directly flow into the working oil storage chamber, agitation of the oil in the working oil storage chamber can be prevented in advance.

(11) In the aspect of (10), the lubrication oil pump may lubricate movable parts in the power unit case, the scavenging pump, the working oil pump and the lubrication oil pump may share a driving system to be configured as an integrated pump unit, and an end wall may be provided at a first end side in an axial direction of the pump unit, a main partition wall configured to partition the inside of the power unit case into the clutch chamber and the oil storage section and a subsidiary partition wall configured to partition the inside of the oil storage section into the working oil storage chamber and the separate oil storage chamber may be formed at a case part that configures the power unit case, an opening in communication with the inside of the working oil storage chamber may be formed in the main partition wall, and a main part of the pump unit may be inserted into the working oil storage chamber from a second end side of the pump unit, and the end wall of the pump unit may be coupled to a peripheral edge section of the opening.

In this case, the working oil storage chamber is formed in the case part of the power unit case by being partitioned by the main partition wall and the subsidiary partition wall, and the opening in communication with the inside of the working oil storage chamber is formed in the main partition wall. For this reason, the case part integrally having the working oil storage chamber can be easily formed by casting. That is, during the casting of the case part, a mold can be easily extracted from the recess space portion in the working oil storage chamber through the opening of the main partition wall.

In addition, the scavenging pump, the working oil pump and the lubrication oil pump share the driving system to be configured as an integrated pump unit, and the pump unit is coaxially provided in the working oil storage chamber. For this reason, the plurality of pumps can be compactly disposed in the power unit case.

Further, the pump unit can be easily installed in the working oil storage chamber by inserting the main part into the working oil storage chamber through the opening and coupling the end wall to the peripheral edge section of the opening.

(12) In the aspect of (1), the oil supply structure for a power unit may further include a through-hole which passes through the working oil storage chamber and the lubrication oil storage chamber in a direction in which the working oil storage chamber and the lubrication oil storage chamber are disposed in parallel; and a single drain bolt configured to close the through-hole.

In this case, both of the working oil storage chamber and the lubrication oil storage chamber can be covered by the single drain bolt. That is, as the above-mentioned configuration is employed, both of the working oil storage chamber and the lubrication oil storage chamber can be closed by the single drain bolt. In addition, the oil can be simultaneously discharged from both of the working oil storage chamber and the lubrication oil storage chamber by extracting the drain bolt.

(13) In the aspect of (12), a female screw section formed at the lubrication oil storage chamber side and a communication section in communication with the working oil storage chamber at a position closer to a bolt head side than the female screw section may be formed at a periphery of the through-hole, and the drain bolt may have a male screw section configured to be threadedly engaged with the female screw section and an O-ring configured to be disposed between the male screw section and the communication section.

In this case, even in a simple configuration in which a complex configuration is not needed, the working oil storage chamber and the lubrication oil storage chamber can be sealed. Further, the oil can be discharged from both of the working oil storage chamber and the lubrication oil storage chamber by removing the drain bolt.

Advantageous Effects of Invention

According to the aspects of the present invention, oil overflowed from the working oil storage chamber is stored in the lubrication oil storage chamber. For this reason, an alarm signal can be output early at the hydraulic pressure detection part side of the lubrication oil supply system upon a decrease in flow rate of the oil without requiring difficult setting or tuning of specifications of the working oil passage.

In addition, according to another aspect of the present invention, the bent section having the bent top section disposed at a position higher than the liquid surface height of the oil in the oil storage section is formed at the suction passage connected to the suction section of the scavenging pump. For this reason, even when the scavenging pump is stopped for a long time, backflow of the oil in the oil storage section into the low liquid surface chamber via the scavenging pump and the suction passage can be suppressed.

DESCRIPTION OF EMBODIMENTS

First Embodiment

Hereinafter, a first embodiment of the present invention will be described with reference to the accompanying drawings. Further, directions of forward, rearward, leftward, rightward, and so on in the following description are the same directions as that of a vehicle to be described below unless the context clearly indicates otherwise.

In addition, in an appropriate place used in the following description, an arrow FR representing a forward side of a vehicle, an arrow LH representing a leftward side of the vehicle, and an arrow UP representing an upward side of the vehicle are shown.

Figure 1:
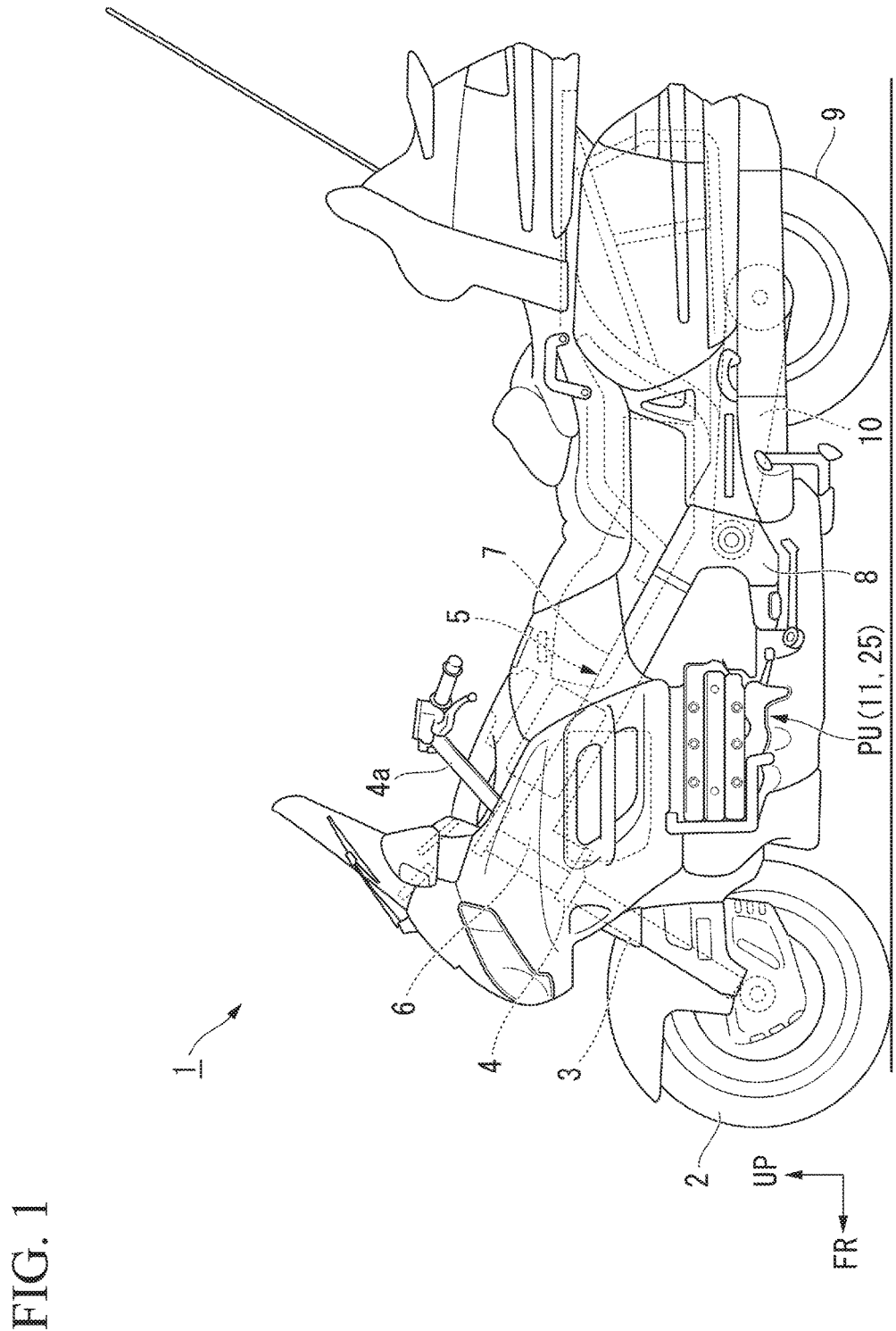
FIG. 1 is a left side view of a motorcycle according to an embodiment of the present invention.

FIG. 1 is a view showing a left side surface of a motorcycle 1 that employs a power unit PU according to the embodiment.

In the motorcycle 1 shown in FIG. 1, a front wheel 2 thereof is axially supported by lower end portions of a pair of left and right front forks 3. Upper portions of the left and right front forks 3 are operably pivoted at a head pipe 6 of a front end of a vehicle body frame 5 via a steering stem 4. A handle 4a for front wheel steering is attached to an upper portion of the steering stem 4.

A pair of left and right main frames 7 extends from the head pipe 6 in a rearwardly inclined direction. Upper end portions of pivot frames 8 continue to rear end portions of the left and right main frames 7. The power unit PU including a horizontal facing type 6-cylinder engine 11 and a multi-stage type transmission 25 is mounted at a downward side of the left and right main frames 7 and a forward side of the left and right pivot frames 8.

A front end portion of a swing arm 10 that axially supports a rear wheel 9 is pivoted at the left and right pivot frames 8 to be upwardly and downwardly swingable. The swing arm 10 is a cantilever type in which the rear wheel 9 is axially supported at a rear end portion of a hollow right arm. A drive shaft (not shown) extending from the transmission 25 of the power unit PU is inserted through the right arm of the swing arm 10, and power transmission between the power unit PU and the rear wheel 9 is performed via a transmission system including the drive shaft.

Figure 2:
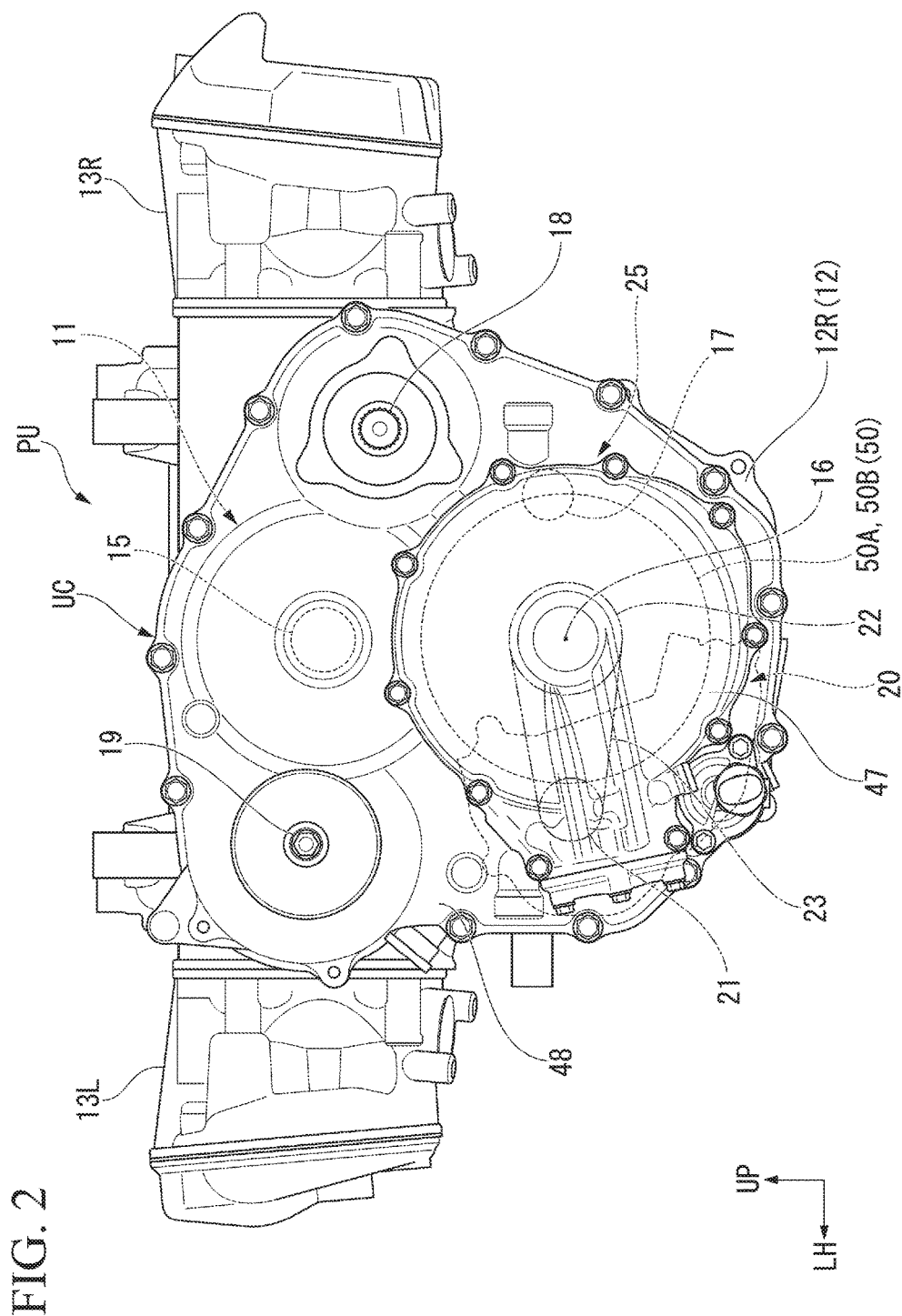
FIG. 2 is a back view of a power unit according to the embodiment of the present invention.
Figure 3:
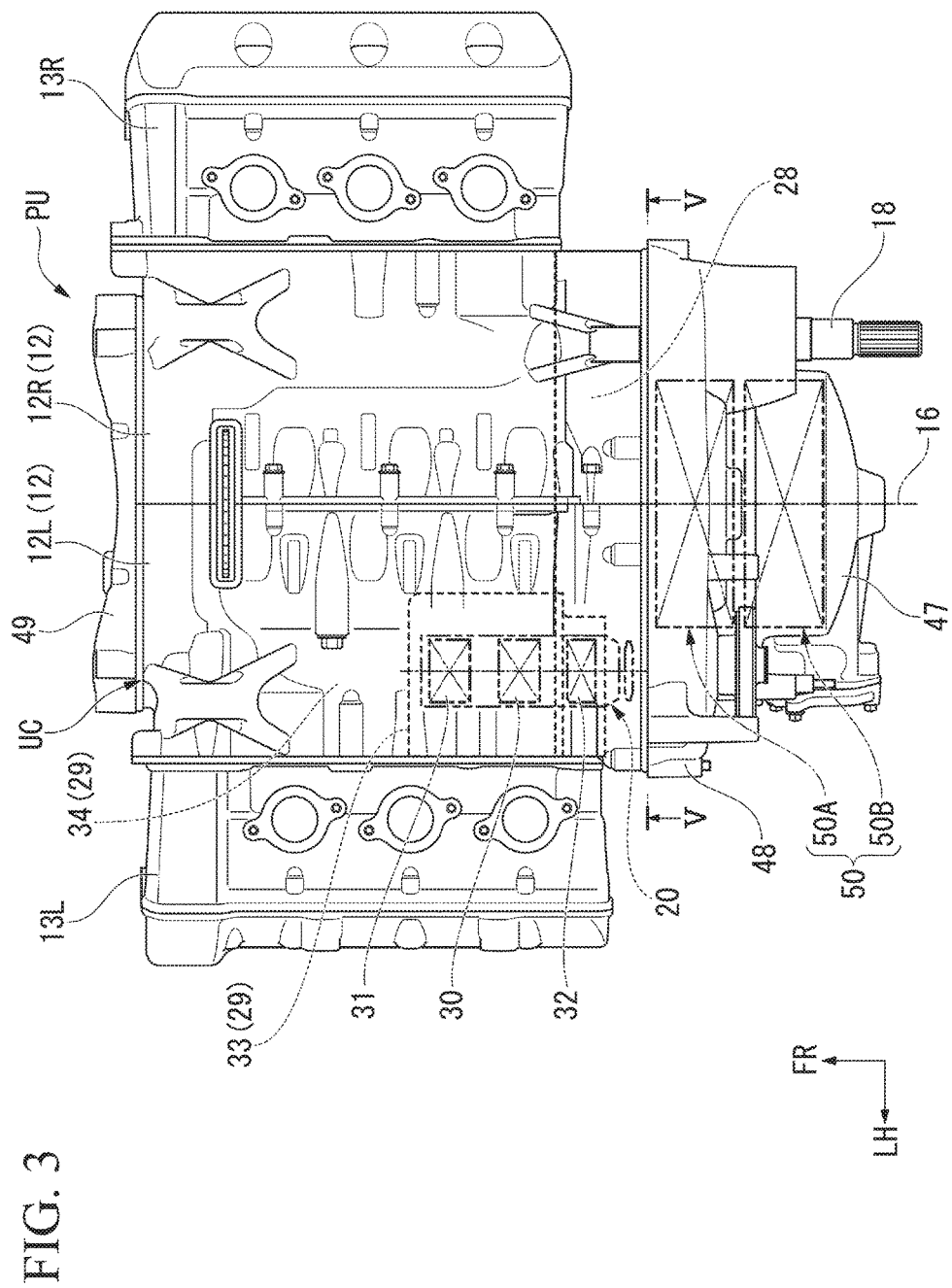
FIG. 3 is a plan view of the power unit according to the embodiment of the present invention.
Figure 4:
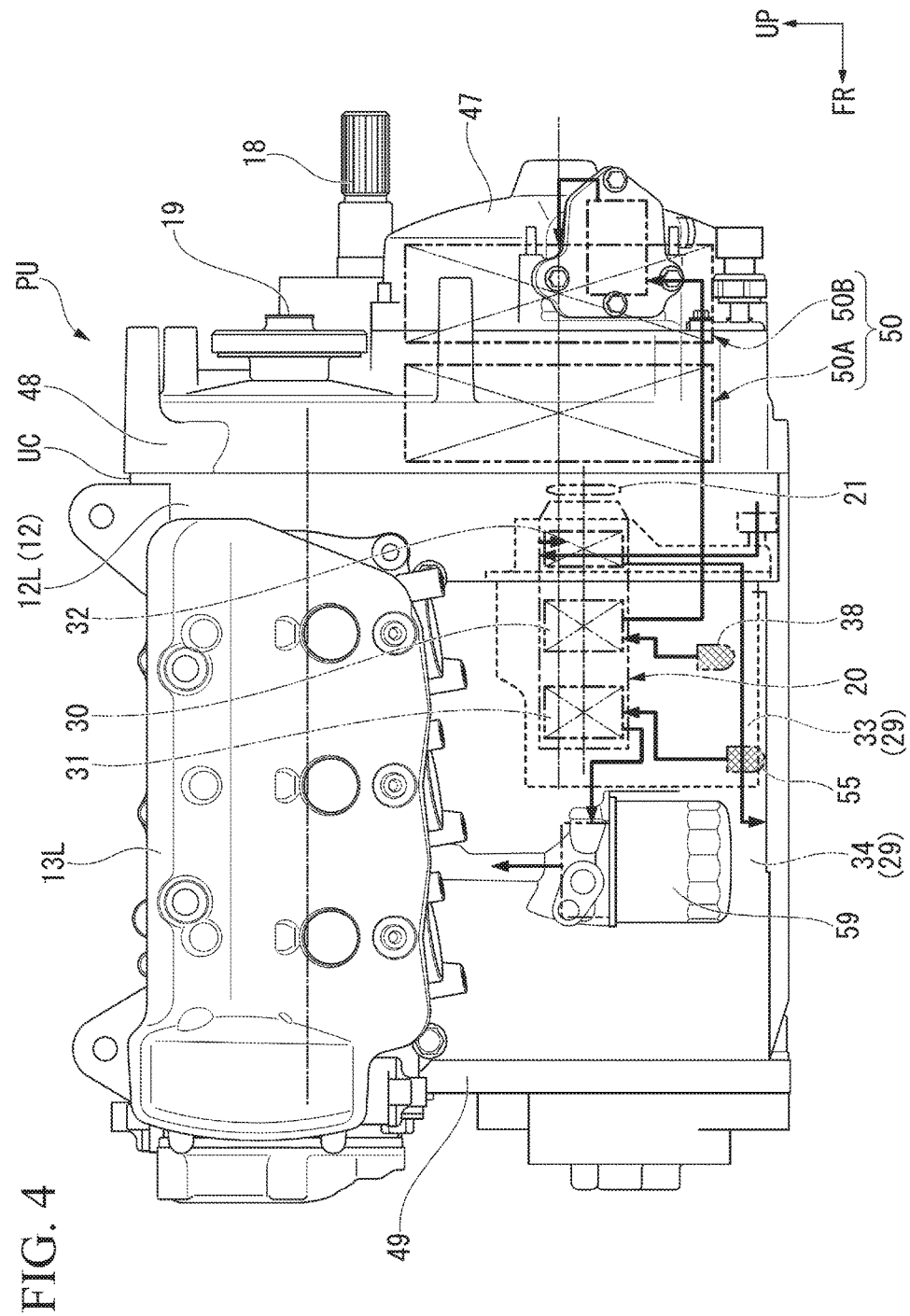
FIG. 4 is a left side view of the power unit according to the embodiment of the present invention.
Figure 5:
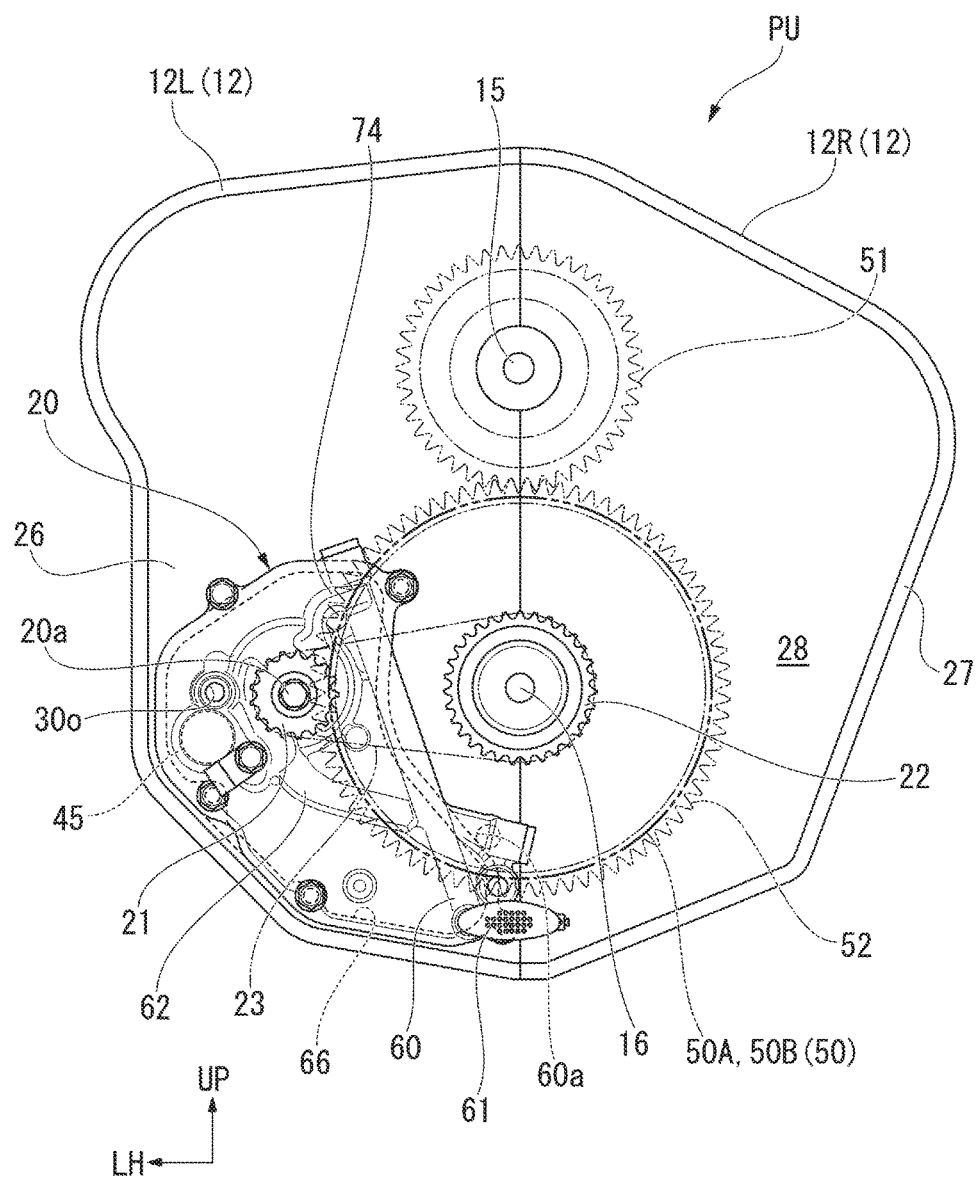
FIG. 5 is a view corresponding to a cross section taken along line V-V of FIG. 3 of the power unit according to the embodiment of the present invention.
Figure 6:
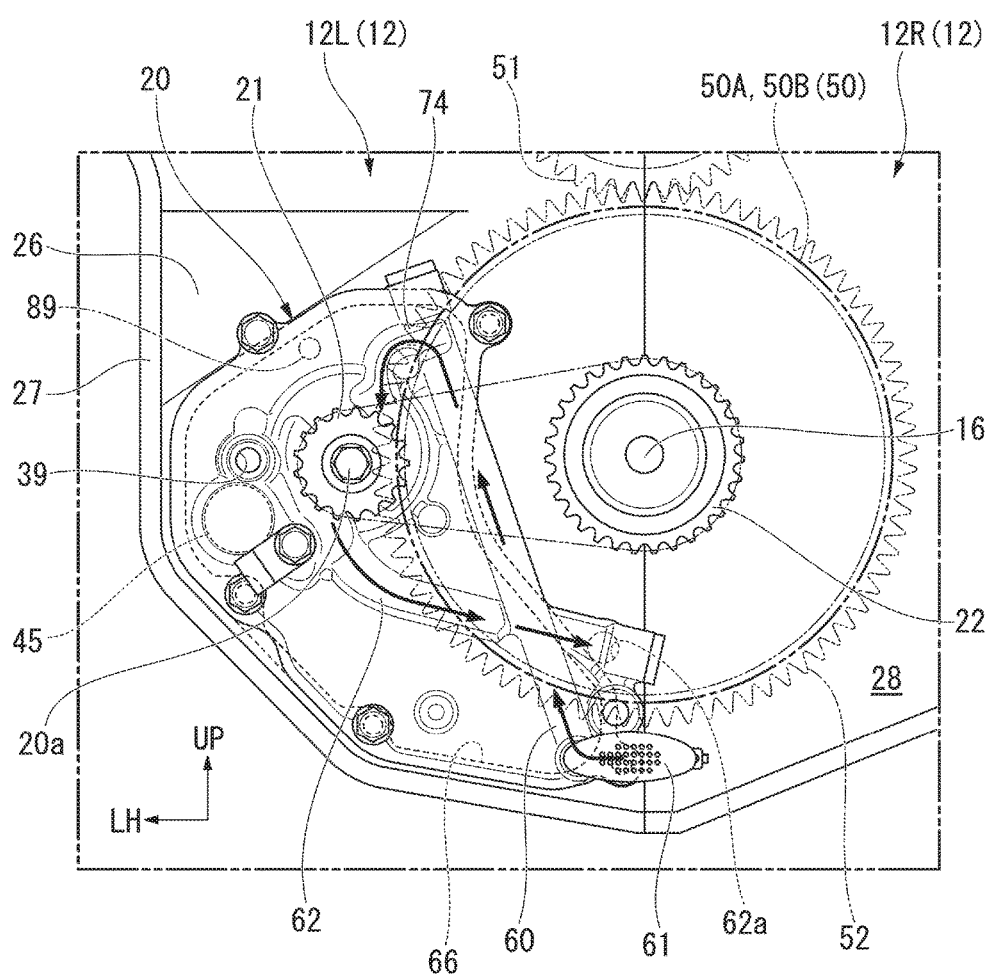
FIG. 6 is an enlarged view showing a portion of FIG. 5 of the power unit according to the embodiment of the present invention.

FIG. 2 is a view showing the power unit PU when seen from a rearward side. FIGS. 3 and 4 are views showing the power unit PU when seen from an upward side and a leftward side. In addition, FIG. 5 is a view corresponding to a cross section taken along line V-V of FIG. 3 of the power unit PU. FIG. 6 is an enlarged view of FIG. 5, some parts of which are removed.

As shown in FIGS. 2 to 6, the power unit PU of the embodiment has a left cylinder section 13L and a right cylinder section 13R formed at left and right sides of an upper portion of a crank case 12 and protruding in a substantially horizontal direction. Three cylinders parallel to forward and rearward directions are installed in each of the left cylinder section 13L and the right cylinder section 13R. The crank case 12 is configured of two blocks divided at a center of the left and right directions. Hereinafter, a left block of the crank case 12 is referred to as a left case half 12L, and a right block is referred to as a right case half 12R.

In addition, a front crank cover 49 is fastened and fixed to an end surface of a forward side of the crank case 12, and a rear crank cover 48 is fastened and fixed to an end surface of a rearward side of the crank case 12. In addition, an opening (not shown) is formed closer to a center than a lower portion of the rear crank cover 48, and the opening is closed by a clutch cover 47 swelling in a bowl shape at the rearward side.

Further, in the case of the embodiment, a power unit case UC is configured of the crank case 12, the left cylinder section 13L and the right cylinder section 13R, the front crank cover 49, the rear crank cover 48, the clutch cover 47, and so on.

In addition, the power unit PU includes a crank shaft 15 of the engine 11 provided in vehicle forward and rearward directions, a main shaft 16 of the transmission 25 disposed parallel to the crank shaft 15 at a downward side of the crank shaft 15, a counter shaft 17 of the transmission 25 disposed parallel to the main shaft 16 at a rightward side of the main shaft 16, an output shaft 18 disposed parallel to the counter shaft 17 at a rightward and upward side of the counter shaft 17, and a generator shaft 19 disposed parallel to the crank shaft 15 at a leftward side of the crank shaft 15. Further, in the crank case 12, a direction in which the crank shaft 15 or the main shaft 16 extends is referred to as an axial direction unless the context clearly indicates otherwise.

Pistons (not shown) reciprocally accommodated in the left cylinder section 13L and the right cylinder section 13R are connected to the crank shaft 15 via connecting rods (similarly not shown). The crank shaft 15 converts linear movement of the pistons according to combustion of gasoline into rotational movement, and outputs the rotational movement to the outside.

A gear train having a plurality of stages that can establish selective power transmission at different gear ratios is installed at the main shaft 16 and the counter shaft 17. Combination of teeth of gear elements of the gear train is appropriately performed by a shifting operation by a driver. In addition, the output shaft 18 of the transmission 25 protrudes from a rear section of the crank case 12 toward a rearward side of the vehicle body. The output shaft 18 receives power from the counter shaft 17 to be rotated, and transmits the rotation to the rear wheel 9 via a power transmission system such as a drive shaft or the like.

As shown in FIG. 5, a prime drive gear 51 is attached to a rear end side of the crank shaft 15, and a twin type clutch apparatus (DCT) 50 having a pair of hydraulic clutches 50A and 50B is attached to a rear end side of the main shaft 16. While not shown in detail, the main shaft 16 of the embodiment has a first shaft having gears corresponding to variable speed levels having odd numbered stages, and a second shaft that holds gears corresponding to variable speed levels having even numbered stages. A primary driven gear 52 meshed with the prime drive gear 51 of the crank shaft 15 side is attached to the power input unit of the clutch apparatus 50. Then, the hydraulic clutches 50A and 50B in the front and the rear of the clutch apparatus 50 selectively connect the primary driven gear 52 to the first shaft and the second shaft according to gear shifting of the transmission 25. The hydraulic clutches 50A and 50B are controlled by a hydraulic pressure regulated based on a control signal of a controller (not shown). Further, the hydraulic clutches 50A and 50B are disposed at a lower side region in the power unit case UC under the crank shaft 15.

In addition, a pump unit 20 in which a plurality of oil pumps (to be described below) are integrally combined is disposed at a left lower side of the left case half 12L of the crank case 12. As shown in FIG. 5, the pump unit 20 has a common shaft section 20a, and a pump gear 21 is integrally attached to one end of the shaft section 20a. In addition, a pump driving gear 22 is integrally connected to be rotatable with the primary driven gear 52, and a transmission chain 23 is hung over the pump driving gear 22 and the pump gear 21. Rotation of the primary driven gear 52 (rotation of the crank shaft 15) is transmitted to the shaft section 20a of the pump unit 20 via the pump gear 21, the transmission chain 23 and the pump driving gear 22.

Here, a rear partition wall 26 (a main partition wall) configured to partition a main space section in the crank case 12 and a space section in which the hydraulic clutches 50A and 50B are mainly accommodated in a rear section of the crank case 12 is formed at the rear section of the crank case 12. The rear partition wall 26 is formed throughout the left case half 12L and the right case half 12R of the crank case 12. In addition, a peripheral wall 27 protruding toward a rearward side farther than the rear partition wall 26 is formed at a rear end portion of the crank case 12, and the rear crank cover 48 abuts a peripheral wall thereof to be fastened and fixed thereto. In addition to the hydraulic clutches 50A and 50B, the prime drive gear 51 and the primary driven gear 52, the pump driving gear 22, the pump gear 21, and so on, are disposed in a space of the rear section of the crank case 12 sandwiched between the rear partition wall 26 and the rear crank cover 48. The space configures a clutch chamber 28 according to the embodiment.

In addition, in the main space section in the crank case 12 partitioned by the rear partition wall 26, parts around the crank shaft 15 of the engine 11 or a gear group of the transmission 25 are disposed, and further, a main part of the above-mentioned pump unit 20 is also disposed. A downward region of the space section is an oil storage section 29 in which oil used for lubrication of the engine 11 or the transmission 25, operations of the hydraulic clutches 50A and 50B, or the like, accumulate. Accordingly, the rear partition wall 26 of the rear section of the crank case 12 partitions the inside of the power unit case UC into the oil storage section 29 and the clutch chamber 28.

Incidentally, the above-mentioned pump unit 20 has a working oil pump 30 configured to pump oil into the hydraulic clutches 50A and 50B, a lubrication oil pump 31 configured to pump oil for lubricating the inside of the engine 11 or the transmission 25, and a scavenging pump 32 configured to suction the oil flowed into the clutch chamber 28 to the oil storage section 29. The scavenging pump 32 suppresses an increase in operational resistance of the hydraulic clutches 50A and 50A according to the immersion of the hydraulic clutches 50A and 50B in the oil by suctioning the oil out of the bottom section side of the clutch chamber 28 to the oil storage section 29 and decreasing the liquid surface of the oil in the clutch chamber 28.

Figure 7:
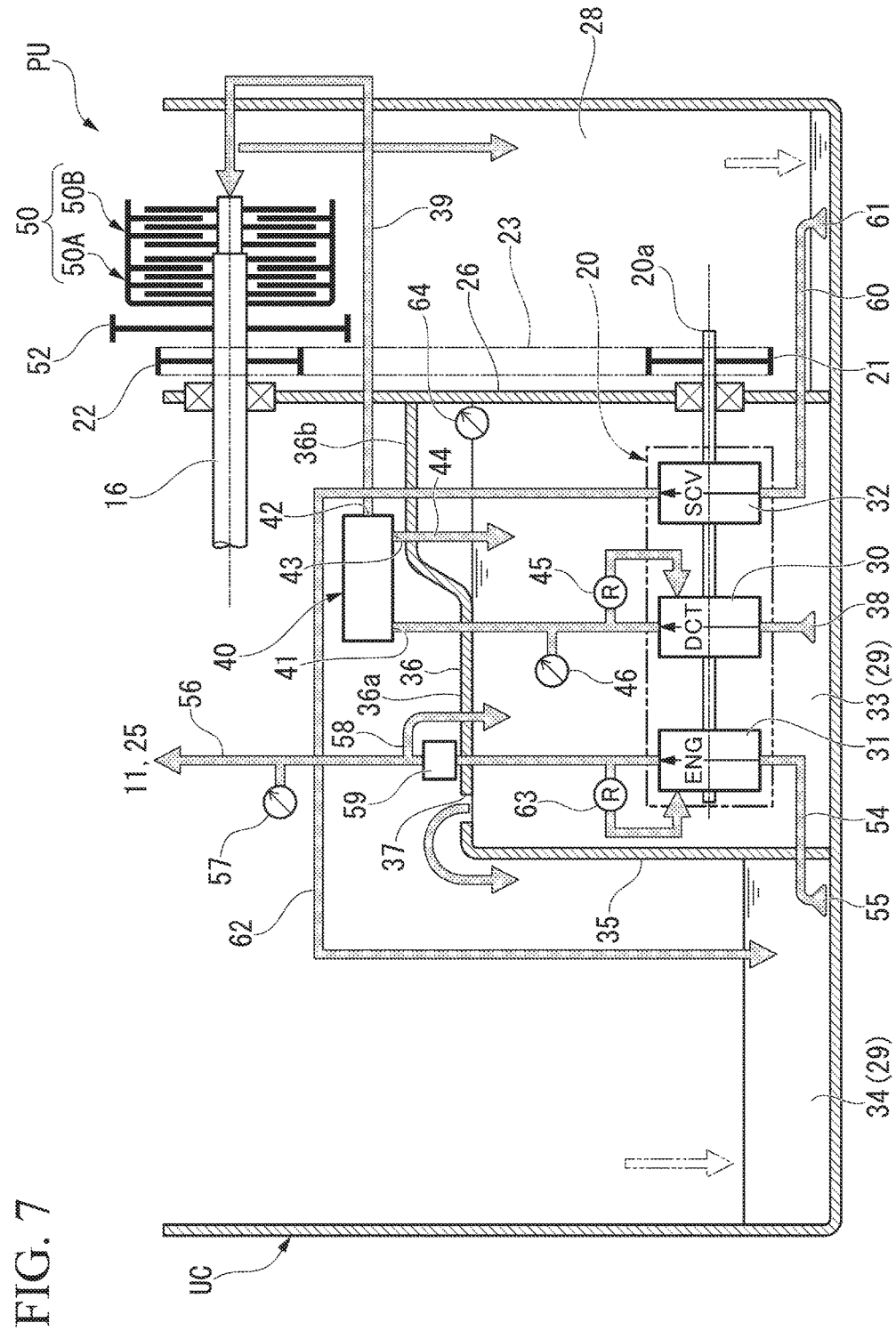
FIG. 7 is a view schematically showing an oil supply system of the power unit according to the embodiment of the present invention.

FIG. 7 is a view showing a schematic configuration of an oil supply system in the power unit PU according to the embodiment.

As shown in FIG. 7, the oil supply system of the power unit PU is generally configured of three oil supply systems such as a working oil supply system, a lubrication oil supply system and a scavenging oil supply system. The three oil supply systems drive the three oil pumps in the pump unit 20 (the working oil pump 30, the lubrication oil pump 31 and the scavenging pump 32) as hydraulic pressure supply sources.

Hereinafter, the entire structure of the oil supply system in the power unit PU will be described with reference to FIG. 7. The inside of the power unit casing UC is partitioned into the oil storage section 29 and the clutch chamber 28 by the rear partition wall 26 as described above. A space section surrounded and substantially closed by a peripheral wall 35 and an upper wall 36 is formed at the bottom section in the oil storage section 29, and the space section therein is a working oil storage chamber 33 in which oil mainly used in the working oil supply system is stored. In addition, a space section outside the working oil storage chamber 33 of the bottom region in the oil storage section 29 is a lubrication oil storage chamber 34 in which oil mainly used in the lubrication oil supply system is stored.

The upper wall 36 of the working oil storage chamber 33 has a low wall 36a and a high wall 36b having a height larger than that of the low wall 36a, and a through-hole 37 through which the oil in the working oil storage chamber 33 flows out into the lubrication oil storage chamber 34 of the outside is formed in the low wall 36a. The through-hole 37 functions such that the oil in the working oil storage chamber 33 overflows the inside of the lubrication oil storage chamber 34 when a liquid surface height of the oil returned and stored in the working oil storage chamber 33 exceeds a defined height. The oil overflowed from the working oil storage chamber 33 is stored in the lubrication oil storage chamber 34.

A suction section of the working oil pump 30 comes into communication with the bottom section of the working oil storage chamber 33 via the oil strainer 38. The working oil pump 30 suctions the oil from the inside of the working oil storage chamber 33 via the oil strainer 38. Meanwhile, an ejection part of the working oil pump 30 is connected to a working oil passage 39 which continues to the hydraulic clutches 50A and 50B.

A hydraulic pressure regulation apparatus 40 configured to regulate a pressure of the oil supplied to the hydraulic clutches 50A and 50B is interposed in the middle of the working oil passage 39. Further, in FIG. 7, while only one hydraulic pressure regulation apparatus 40 is shown, actually, two hydraulic pressure regulation apparatuses 40 are installed to correspond to the hydraulic clutches 50A and 50B. In addition, a side of the working oil passage 39 downstream from the hydraulic pressure regulation apparatus 40 is bifurcated and branched to be connected to the hydraulic clutches 50A and 50B.

While a structure of each of the hydraulic pressure regulation apparatuses 40 will be described below in detail, the hydraulic pressure regulation apparatus 40 has an oil introduction port 41 into which the oil pumped from the working oil pump 30 is introduced, a control port 42 configured to supply the oil regulated to the set hydraulic pressure to the corresponding hydraulic clutch 50A or 50B, and a drain port 43 configured to discharge excessive oil introduced into the oil introduction port 41. The oil discharged from the drain port 43 is returned to the working oil storage chamber 33 through a returning passage 44.

In addition, a relief valve 45 configured to return the excessive oil to the working oil storage chamber 33 and a hydraulic pressure sensor 46 serving as a working oil pressure detection part are installed in a portion of the working oil passage 39 in the vicinity of the ejection section of the working oil pump 30.

The hydraulic pressure sensor 46 outputs an alarm signal when the pressure in the working oil passage 39 decreases to a predetermined value or less. Specifically, the hydraulic pressure sensor 46 is connected to an input section of a controller (not shown). The controller turns on, for example, an alarm display lamp of a display panel when it is determined that the pressure in the working oil passage 39 is the predetermined value or less based on a detected value of the hydraulic pressure sensor 46.

In addition, a liquid surface switch 64 configured to emit an alarm signal when a liquid surface height of the oil in the working oil storage chamber 33 is a lower than a predetermined height is installed in the working oil storage chamber 33. Specifically, the liquid surface switch 64 is turned on when the liquid surface height of the oil in the working oil storage chamber 33 is the predetermined height or less, and for example, directly turns on the alarm display lamp of the display panel.

A suction passage 54 is connected to the suction section of the lubrication oil pump 31, and the suction passage 54 passes through the peripheral wall 35 (the wall) of the working oil storage chamber 33. An end portion of the suction passage 54 passing through the peripheral wall 35 comes into communication with the bottom section of the lubrication oil storage chamber 34 via an oil strainer 55. The lubrication oil pump 31 suctions the oil from the inside of the lubrication oil storage chamber 34 via the oil strainer 55. Meanwhile, the ejection section of the lubrication oil pump 31 is connected to a lubrication oil passage 56 which continues to lubrication-requiring parts of the engine 11 or the transmission 25.

A low hydraulic pressure switch 57 serving as a lubrication hydraulic pressure detection part is installed in the middle of the lubrication oil passage 56. The low hydraulic pressure switch 57 outputs an alarm signal when the pressure of the oil supplied to the lubrication-requiring parts of the engine 11 or the transmission 25 from the lubrication oil passage 56 is a predetermined value or less. Specifically, the low hydraulic pressure switch 57 is turned on when the pressure of the oil in the lubrication oil passage 56 is decreased to the predetermined value or less, and for example, directly turns on the alarm display lamp of the display panel.

A relief valve 63 through which excessive oil flows into the working oil storage chamber 33 is installed in a portion of the lubrication oil passage 56 in the vicinity of the ejection section of the lubrication oil pump 31. In addition, a transition passage 58 through which some of the oil supplied into the lubrication oil passage 56 is actively flowed into the working oil storage chamber 33 is connected to a portion of the lubrication oil passage 56 extracted from the working oil storage chamber 33 to the outside. Further, a lubrication oil filter 59 configured to purify the oil is interposed at a position of the lubrication oil passage 56 upstream from a branch connecting portion of the transition passage 58.

A suction passage 60 is connected to the suction section of the scavenging pump 32, and the suction passage 60 comes into communication with the bottom section of the clutch chamber 28 via an oil strainer 61. The scavenging pump 32 suctions the oil from the bottom section of the clutch chamber 28 via the oil strainer 61. Meanwhile, the ejection section of the scavenging pump 32 comes into communication with the lubrication oil storage chamber 34 outside the working oil storage chamber 33 through an ejection passage 62. Accordingly, the oil suctioned from the clutch chamber 28 by the scavenging pump 32 flows into the lubrication oil storage chamber 34. Further, in the embodiment, the clutch chamber 28 configures a low liquid surface chamber in the power unit case UC.

Next, a specific internal structure of the power unit PU will be described.

Figure 8:
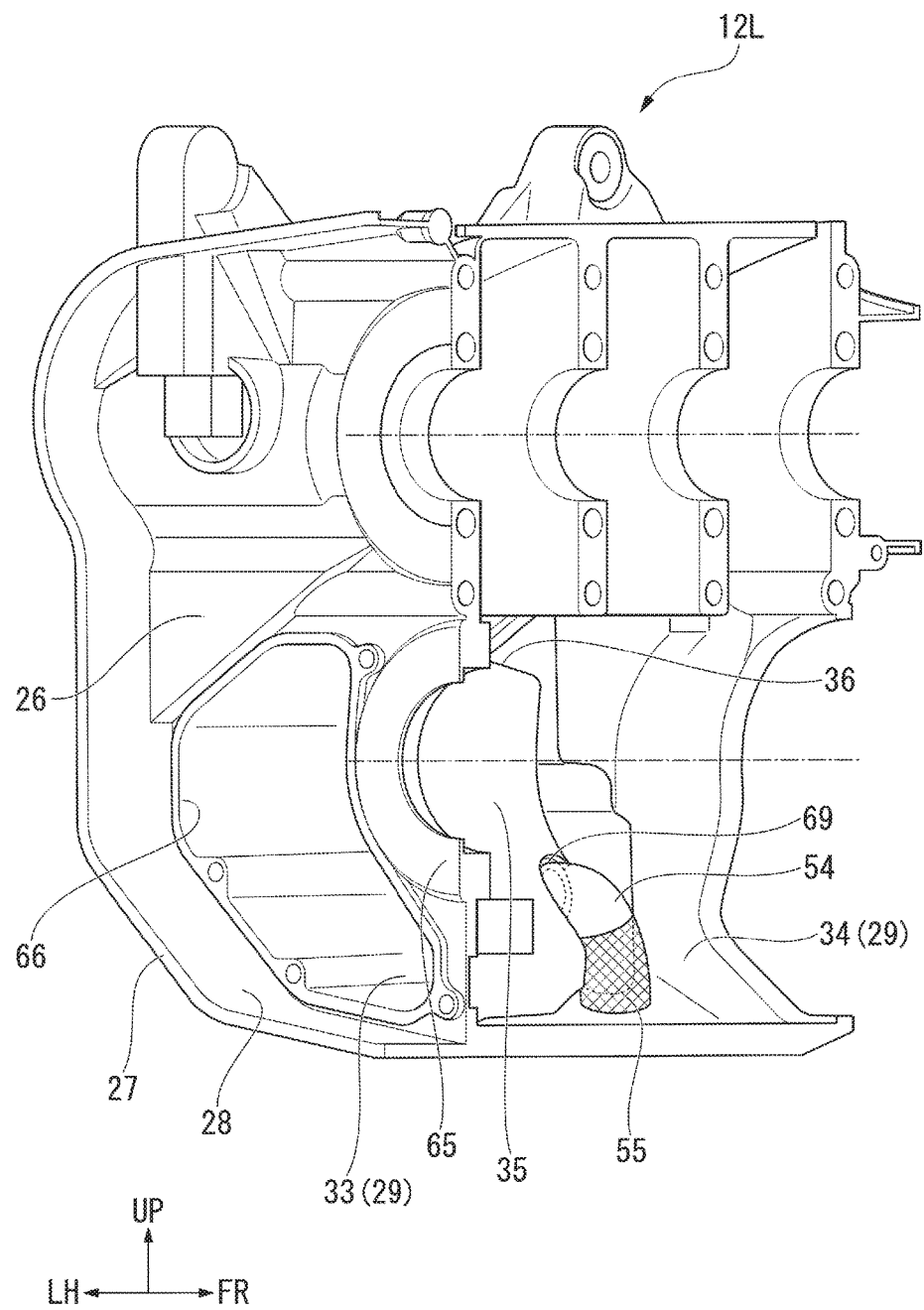
FIG. 8 is a perspective view showing components of a power unit case according to the embodiment of the present invention.
Figure 9:
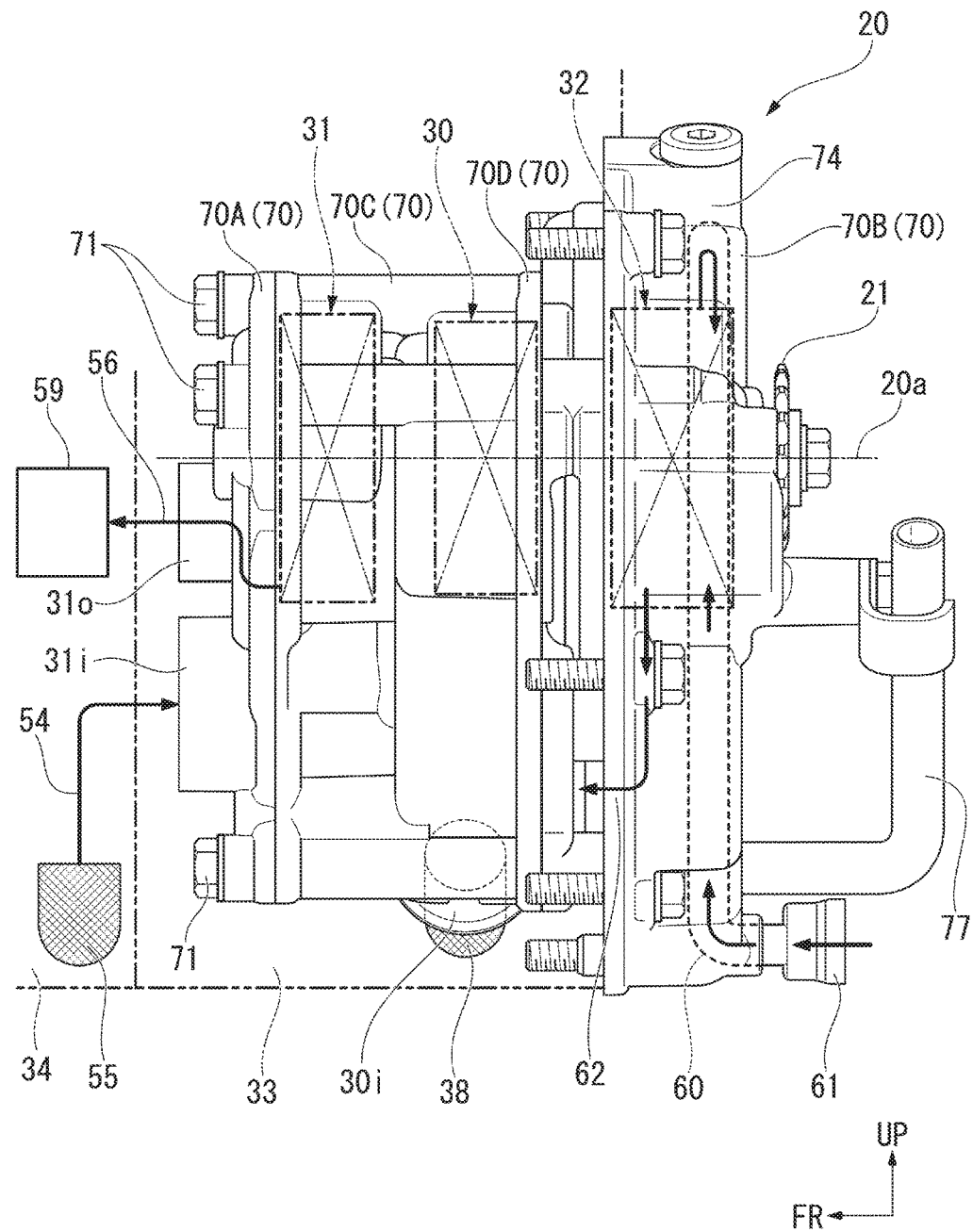
FIG. 9 is a side view of a pump unit built into the power unit according to the embodiment of the present invention.
Figure 10:
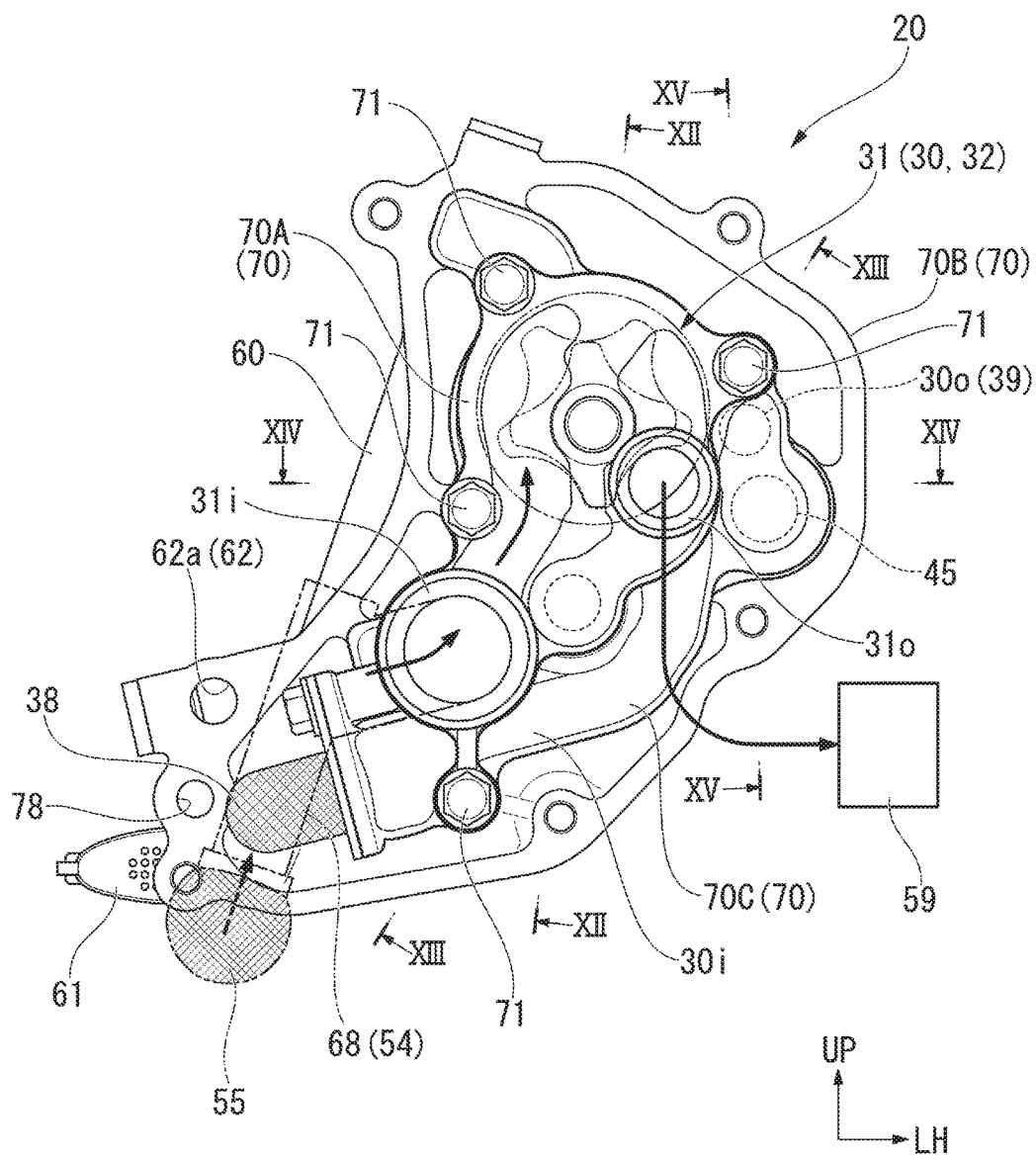
FIG. 10 is a back view of the pump unit built into the power unit according to the embodiment of the present invention.
Figure 11:
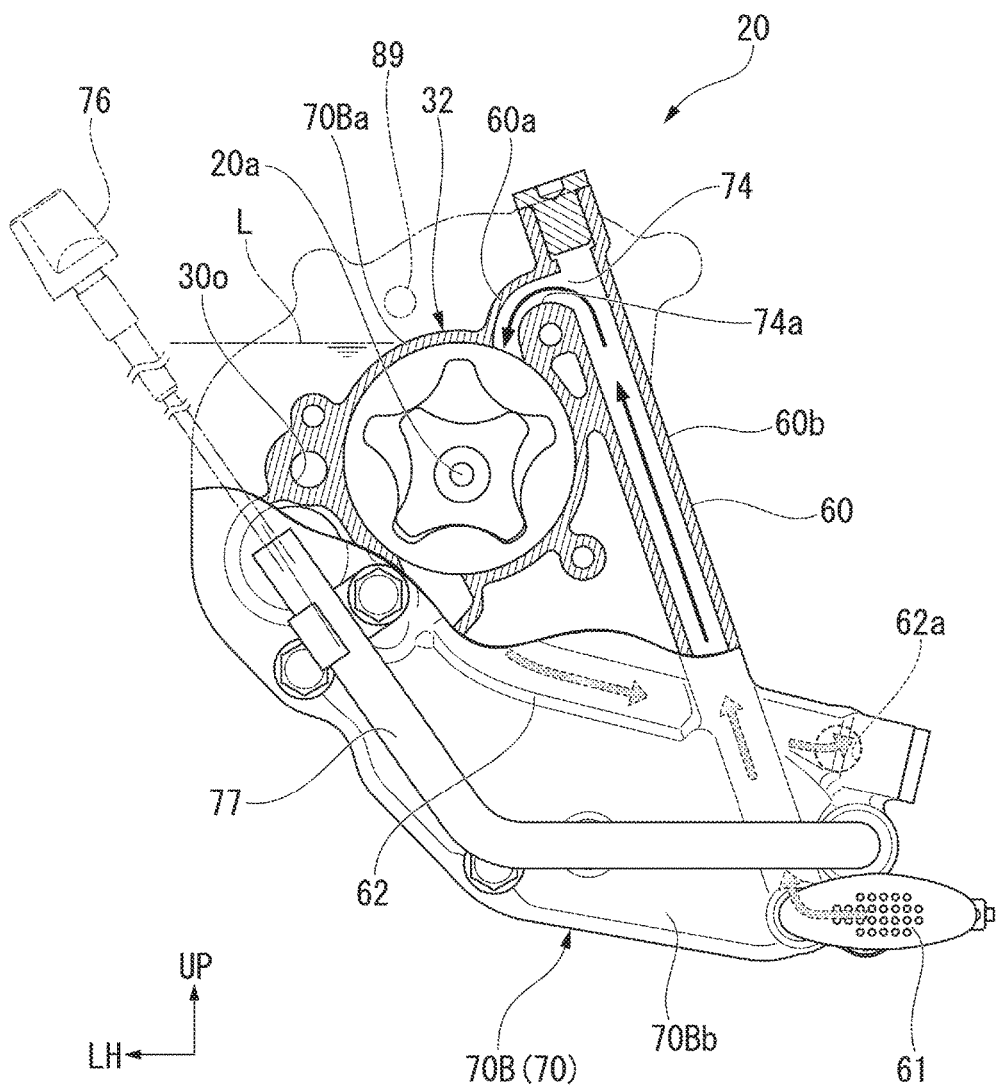
FIG. 11 is a front view showing a cross section of a portion of the pump unit built into the power unit according to the embodiment of the present invention.

FIG. 8 is a view showing the left case half 12L of the crank case 12 when seen from an upwardly inclined side of a center in the left and right directions of the crank case 12. FIG. 9 is a view showing the pump unit 20 when seen from a side surface thereof. In addition, FIG. 10 is a view showing the pump unit 20 when seen from a forward side of the vehicle body (a front view of the pump unit 20). FIG. 11 is a view showing the pump unit 20, a portion of which is cutout, when seen from a rearward side of the vehicle body (a bottom view of the pump unit 20). In addition, FIGS. 12 to 15 are views showing cross sections of parts in the power unit PU around the pump unit 20.

As shown in FIG. 8, a relatively large opening 66 in communication with the clutch chamber 28 side and the oil storage section 29 side is formed at a lower left side of the rear partition wall 26 of the left case half 12L. The opening 66 is formed in a deformed trapezoidal shape, in which both sidewalls are slightly curved, between a journal section 65 configured to support the main shaft 16 and a peripheral wall of the left case half 12L.

A recess space section formed in an axial direction of the crank case 12 from the opening 66 is integrally provided at the oil storage section 29 side of the opening 66 of the rear partition wall 26. The recess space section is formed by a peripheral wall of the left case half 12L from a left side surface section to a lower surface section, walls which continue to the rear partition wall 26 of the left case half 12L and the peripheral wall are formed at a right side surface section and an upper surface section, and further, a bottom surface section (a surface portion of the forward side of the vehicle body). The space section configures the above-mentioned working oil storage chamber 33 (see FIG. 7) in the oil storage section 29. Further, a wall of an upper side of the space section that configures the working oil storage chamber 33 configures the upper wall 36 of the above-mentioned working oil storage chamber 33, and further, a wall of the right side surface section configures a portion of the peripheral wall 35 of the above-mentioned working oil storage chamber 33. In addition, the walls that configure the right side surface section, the bottom surface section and the upper surface section of the space section (the working oil storage chamber 33) configure a subsidiary partition wall that partitions the inside of the oil storage section 29 into the working oil storage chamber 33 and the lubrication oil storage chamber 34 (a separate storage chamber).

Figure 13:
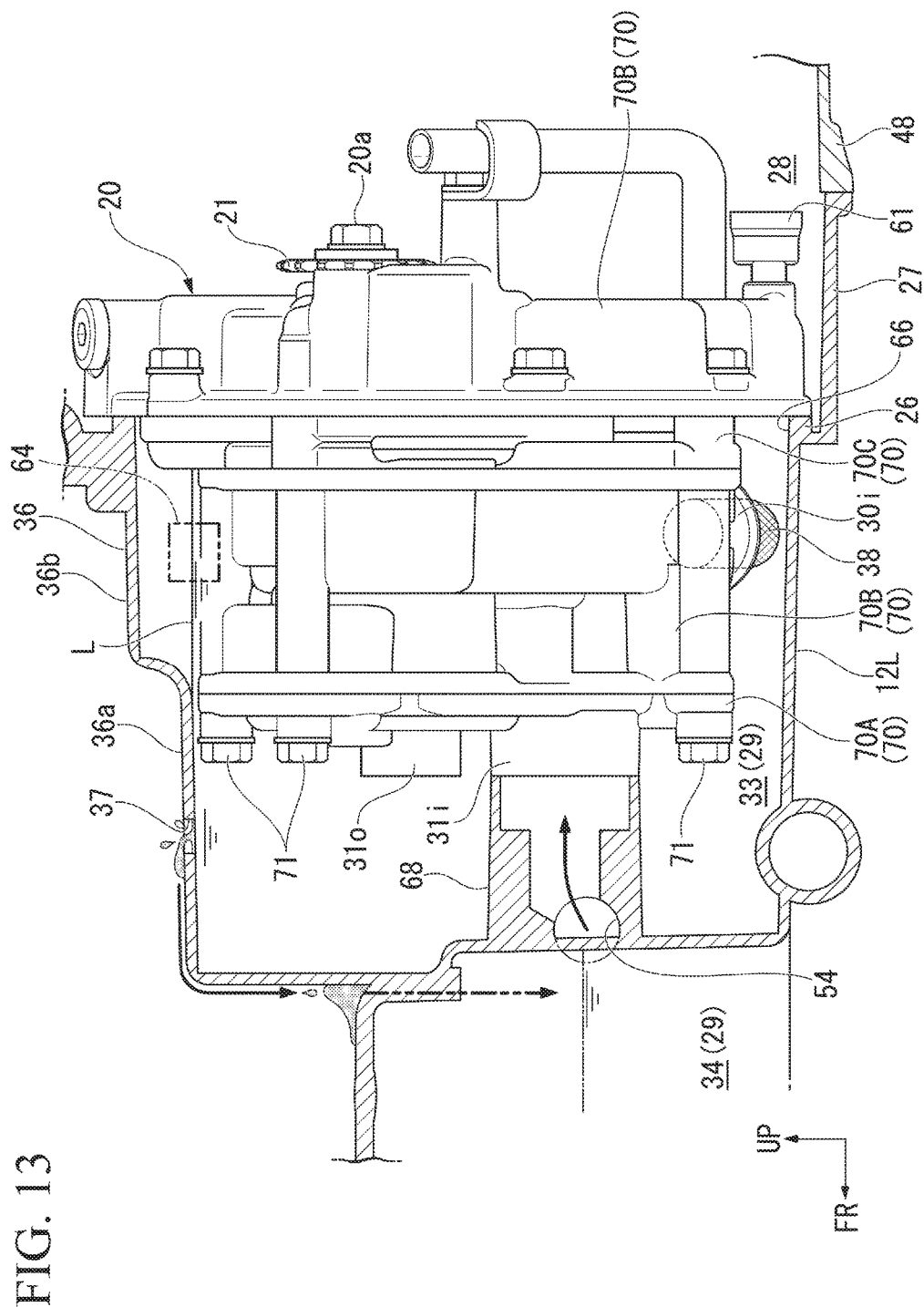
FIG. 13 is a cross-sectional view corresponding to a cross section taken along line XIII-XIII of FIG. 10 of the pump unit built into the power unit according to the embodiment of the present invention.

The upper wall 36 of the working oil storage chamber 33 is formed in a stepped shape as shown in FIG. 13. The through-hole 37 that brings the inside of the working oil storage chamber 33 into communication with the lubrication oil storage chamber 34 of the outside as described above is formed at a portion of the low wall 36a of the upper wall 36. In addition, the above-mentioned liquid surface switch 64 is attached to the wall in the working oil storage chamber 33.

Figure 14:
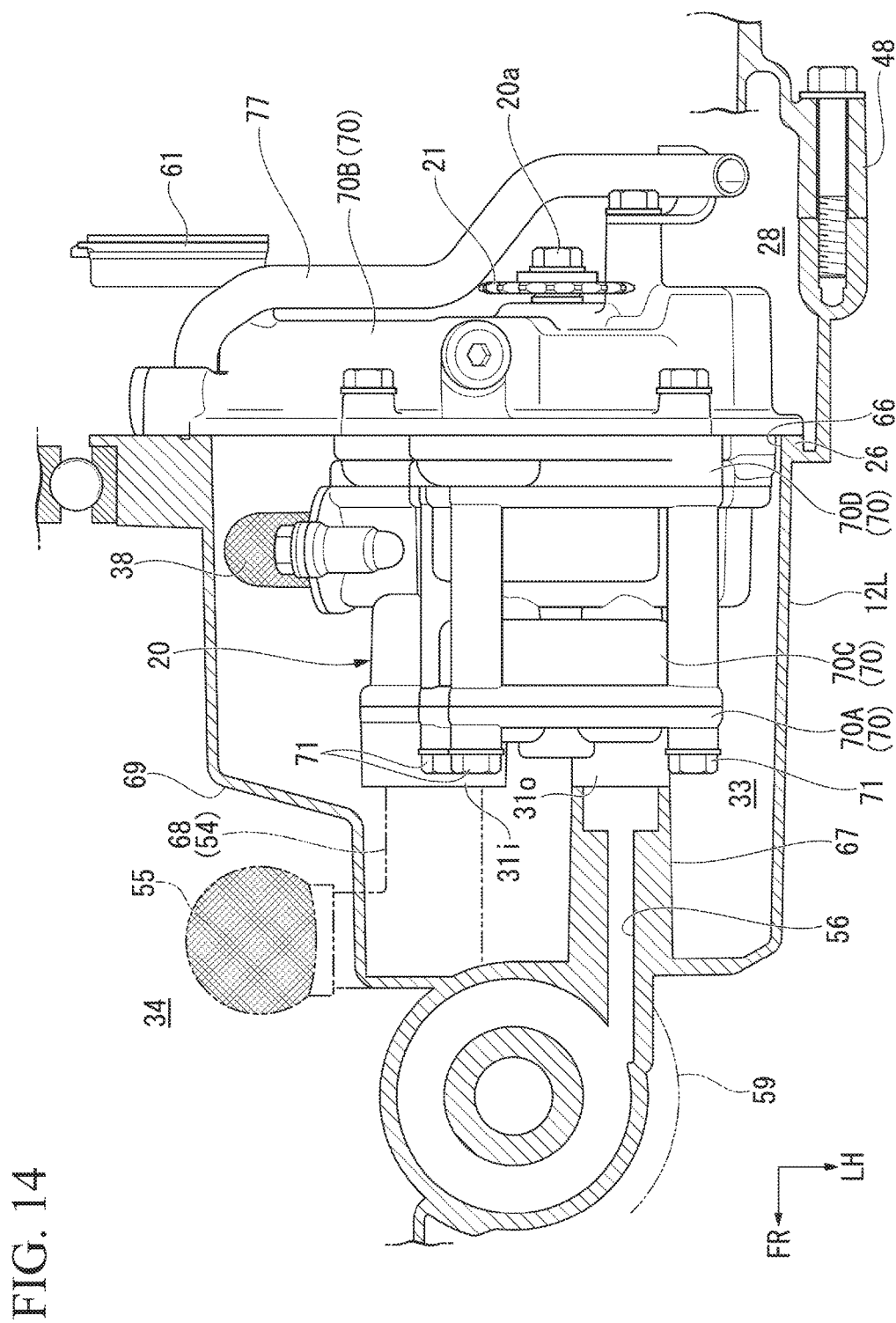
FIG. 14 is a cross-sectional view corresponding to a cross section taken along line XIV-XIV of FIG. 10 of the pump unit built into the power unit according to the embodiment of the present invention.

In addition, as shown in FIG. 14, a lubrication oil supply pipe 67 protruding toward the inside of the working oil storage chamber 33 in the axial direction of the crank case 12 is integrally formed with the wall of the bottom surface section of the working oil storage chamber 33. A first end portion of the supply pipe 67 is connected to the ejection section of the lubrication oil pump 31 of the pump unit 20 in the working oil storage chamber 33, and a second end portion is connected to the lubrication oil filter 59 outside the working oil storage chamber 33. The supply pipe 67 configures a portion of the above-mentioned lubrication oil passage 56 (see FIG. 7). Further, in the case of the embodiment, in order to facilitate attachment and detachment from the outside, the lubrication oil filter 59 is attached to the left case half 12L such that a portion thereof is exposed to the outside (see FIG. 4 and so on).

Further, as shown in FIGS. 13 and 14, a lubrication oil suction pipe 68 protruding toward the inside of the working oil storage chamber 33 in the axial direction of the crank case 12 is integrally formed with the wall of the bottom surface section of the working oil storage chamber 33. The first end portion of the suction pipe 68 is connected to the suction section of the lubrication oil pump 31 of the pump unit 20 in the working oil storage chamber 33, and the second end portion is connected to the oil strainer 55 in the bottom section of the lubrication oil storage chamber 34 outside the working oil storage chamber 33. Further, the second end portion of the suction pipe 68 is bent at a right side of the working oil storage chamber 33 and connected to the oil strainer 55 at a stepped recess section 69 formed at a sidewall of a right side of the working oil storage chamber 33. The suction pipe 68 configures a portion of the above-mentioned suction passage 54 (see FIG. 7).

Meanwhile, as shown in FIGS. 9 to 15, in the pump unit 20, a unit case 70 is configured of overlapping two intermediate blocks 70C and 70D in the axial direction between a pair of end blocks 70A and 70B and fastening them to each other by bolts 71. In the present embodiment, each of the oil pumps (the lubrication oil pump 31, the working oil pump 30 and the scavenging pump 32) is configured of a trochoid pump.

The lubrication oil pump 31 is disposed between first end block 70A and one intermediate block 70C. The working oil pump 30 is disposed between the one intermediate block 70C and the other intermediate block 70D. The scavenging pump 32 is disposed between the other intermediate block 70D and the second end block 70B.

Figure 12:
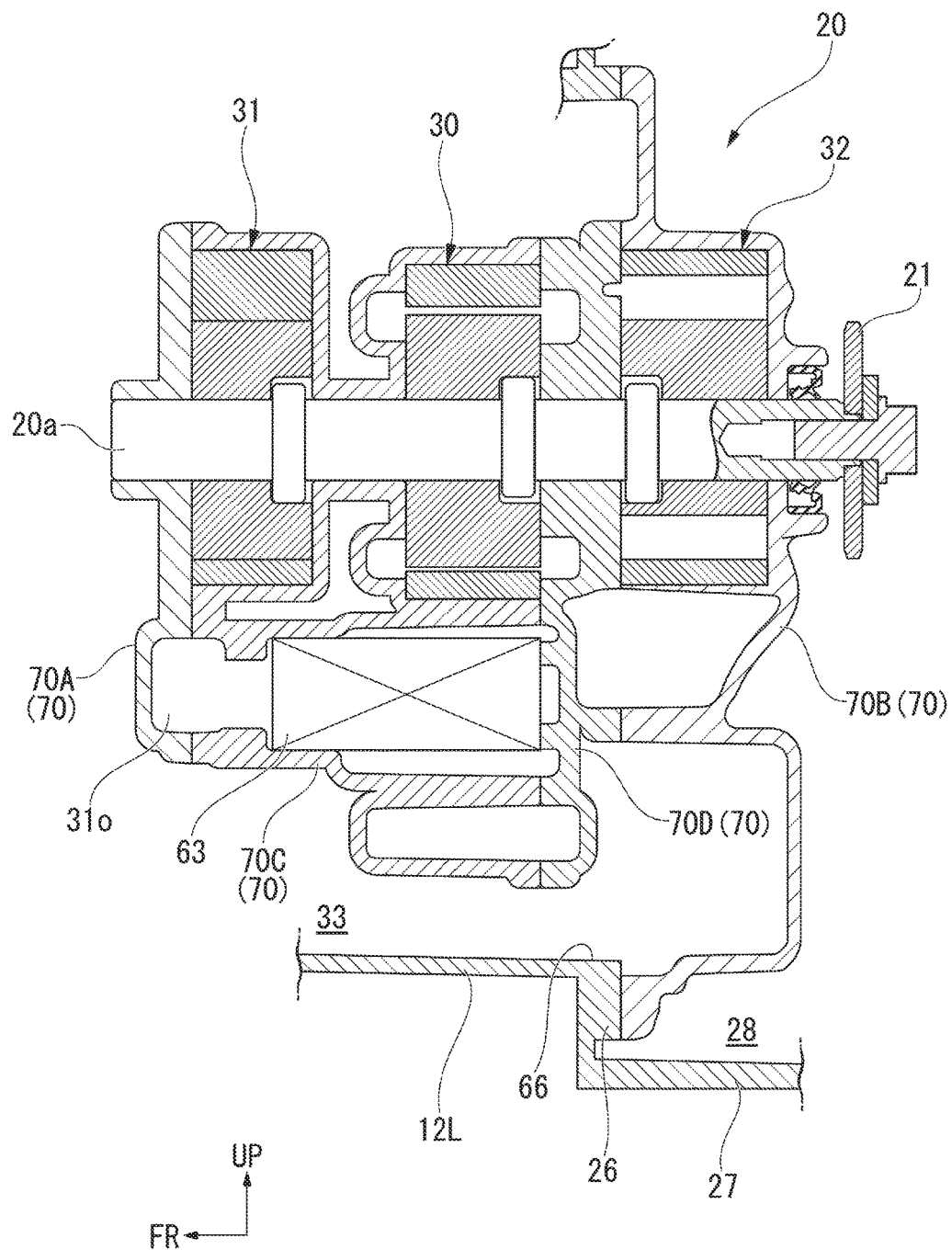
FIG. 12 is a cross-sectional view corresponding to a cross section taken along line XII-XII of FIG. 10 of the pump unit built into the power unit according to the embodiment of the present invention.

As shown in FIGS. 13, 14, and so on, a suction section 31i and an ejection section 31o of the lubrication oil pump 31 are configured to be connected to the suction pipe 68 and the supply pipe 67 protruding outward from the first end block 70A in the axial direction and protruding inward from the wall of the working oil storage chamber 33. In addition, as shown in FIG. 12, the relief valve 63 configured to control an ejection pressure and return the excessive oil to the suction side is interposed in the middle of the ejection section 31o.

Figure 15:
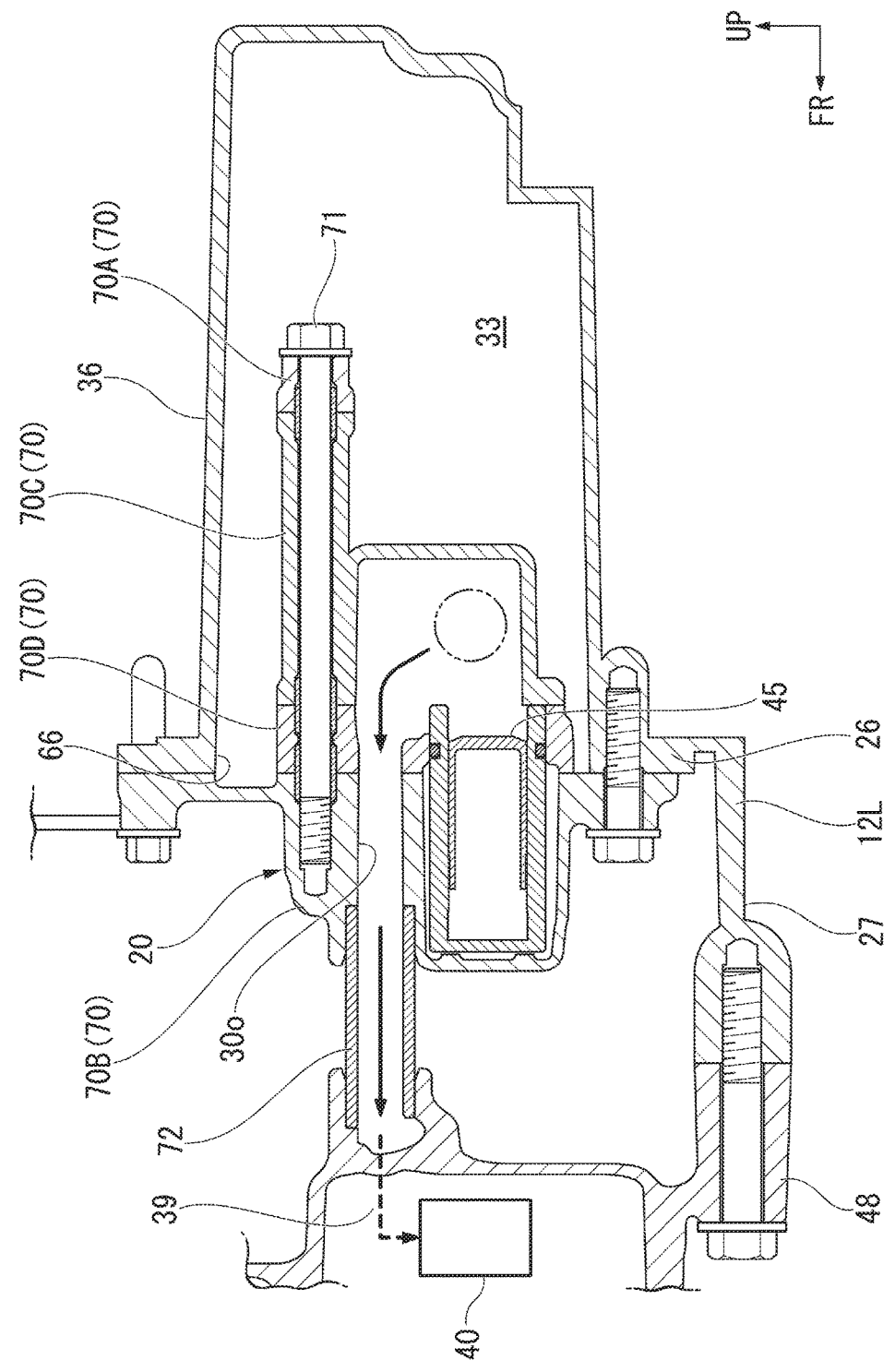
FIG. 15 is a cross-sectional view corresponding to a cross section taken along line XV-XV of FIG. 10 of the pump unit built into the power unit according to the embodiment of the present invention.

As shown in FIGS. 9, 10, and so on, a suction section 30i of the working oil pump 30 extends downward from the one intermediate block 70C, and a lower end thereof is connected to the oil strainer 38. In addition, as shown in FIG. 15 and so on, an ejection section 30o of the working oil pump 30 passes through the other intermediate block 70D and the second end block 70B from the one intermediate block 70C to be opened at an end surface side of the second end block 70B. An opening passing through the second end block 70B is configured to be connected to the working oil passage 39 of the rear crank cover 48 side via a connecting pipe 72. Further, the relief valve 45 configured to control an ejection pressure and return excessive oil to the suction side is interposed in the middle of the ejection section 30o.

The suction section and the ejection section of the scavenging pump 32 are connected to the suction passage 60 and the ejection passage 62 formed over the second end block 70B and the other intermediate block 70D.

The second end block 70B includes a block main body section 70Ba configured to accommodate the scavenging pump 32 or the relief valve 45, and a flange section 70Bb overhanging the end portion in the axial direction adjacent to the intermediate block 70D of the block main body section 70Ba to the outside in the radial direction. The suction passage 60 or the ejection passage 62 is formed over a portion of the flange section 70Bb.

As shown in FIGS. 5 and 6, the exterior of the flange section 70Bb of the end block 70B is formed in a substantially similar shape as the opening 66 of the left case half 12L, but to be slightly larger. An outer edge section of the flange section 70Bb is fixed to a peripheral edge section of the opening 66 of the rear partition wall 26 from the outside of the rear partition wall 26 (from a rearward side) by fastening bolts in a state in which a main part of the pump unit 20 (a portion other than the end block 70B) is inserted into the working oil storage chamber 33 through the opening 66. Accordingly, the opening 66 of the rear partition wall 26 is closed by the end block 70B, the inside of the working oil storage chamber 33 is substantially closed, and a space between the working oil storage chamber 33 and the clutch chamber 28 is also partitioned. In the embodiment, the second end block 70B is formed at the first end side in an axial direction of the pump unit 20 and configures an end wall coupled to a peripheral edge section of the opening 66.

Here, as shown in FIG. 11, the suction passage 60 has an upstream path 60a extending from the suction section of the scavenging pump 32 in an upwardly inclined direction and a lower stream path 60b extending in a downwardly inclined direction while changing a direction at an upper end side of the upstream path 60a, and the upstream path 60a and the lower stream path 60b are connected via a bent section 74 that is curved in a slight arc shape. A lower end of the lower stream path 60b is a suction port of the suction passage 60, and the oil strainer 61 is attached to the suction port. The oil strainer 61 is disposed at the bottom section of the clutch chamber 28 in a state in which the pump unit 20 is attached to the crank case 12.

The bent section 74 is formed such that a top section 74a thereof is disposed above a maximum liquid surface height L in the oil storage section 29, i.e., the maximum liquid surface height L of the oil in the working oil storage chamber 33. For this reason, in the suction passage 60, the suction port (the oil strainer 61) is provided at the first end side of the bent section 74, and the suction section of the scavenging pump 32 is connected to the second end side of the bent section 74.

As described above, the scavenging pump 32 is driven by the shaft section 20a that is shared by the working oil pump 30 and the lubrication oil pump 31. However, an end portion of the common shaft section 20a inside the working oil storage chamber 33 comes into contact with the oil in the working oil storage chamber 33. The shared shaft section 20a of the pump unit 20 is disposed at a height immersed in the oil in the working oil storage chamber 33, i.e., a height lower than a restricted liquid surface height of the oil in the working oil storage chamber 33 (a liquid surface height restricted by the through-hole 37), and a height higher than the suction port (the oil strainer 61) of the suction passage 60.

In addition, the ejection passage 62 connected to the ejection section of the scavenging pump 32 extends toward a lower forward side of the scavenging pump 32 in the second end block 70B, and is opened while changing a direction to a side of an extension end thereof opposite to the rear partition wall 26 of the left case half 12L. In the drawings, the opening is designated by reference numeral 62a (for example, see FIG. 10). The opening 62a comes into communication with the lubrication oil storage chamber 34 in the crank case 12 through the through-hole (not shown) of the rear partition wall 26 when the second end block 70B is fastened and fixed to the rear partition wall 26. Accordingly, the oil suctioned from the clutch chamber 28 by the scavenging pump 32 flows into the lubrication oil storage chamber 34 through the through-hole of the rear partition wall 26.

In addition, as shown in FIG. 11, a gauge insertion tube 77 into which an oil level gauge 76 is inserted is attached to a surface of the end block 70B facing the clutch chamber 28.

The gauge insertion tube 77 extends in a substantially horizontal direction after extending along a peripheral wall of the rear crank cover in a downwardly inclined direction, and an extended end is bent to be connected to a connection hole 78 of the end block 70B. The connection hole 78 is formed at a lower position of the opening 62a of the ejection passage 62 on the end block 70B to pass through the end block 70B in a thickness direction. Then, the connection hole 78 comes into communication with the lubrication oil storage chamber 34 in the crank case 12 through a through-hole (not shown) of the rear partition wall 26 when the second end block 70B is fastened and fixed to the rear partition wall 26. Accordingly, the oil of the lubrication oil storage chamber 34 flows into the gauge insertion tube 77 through the connection hole 78 at the same liquid surface height, and the liquid surface height of the oil can be checked by the oil level gauge 76 with visual observation.

In addition, as shown in FIG. 15, the hydraulic pressure regulation apparatus 40 configured to regulate the pressure of the oil supplied to each of the hydraulic clutches 50A and 50B is attached to the clutch cover 47 configured to cover the outside of the rear crank cover 48, specifically, the outside of the end portions of the hydraulic clutches 50A and 50B. A portion of the working oil passage 39 configured to connect the hydraulic pressure regulation apparatus 40 and the hydraulic clutches 50A and 50B is formed at a portion of the clutch cover 47.

Figure 16:
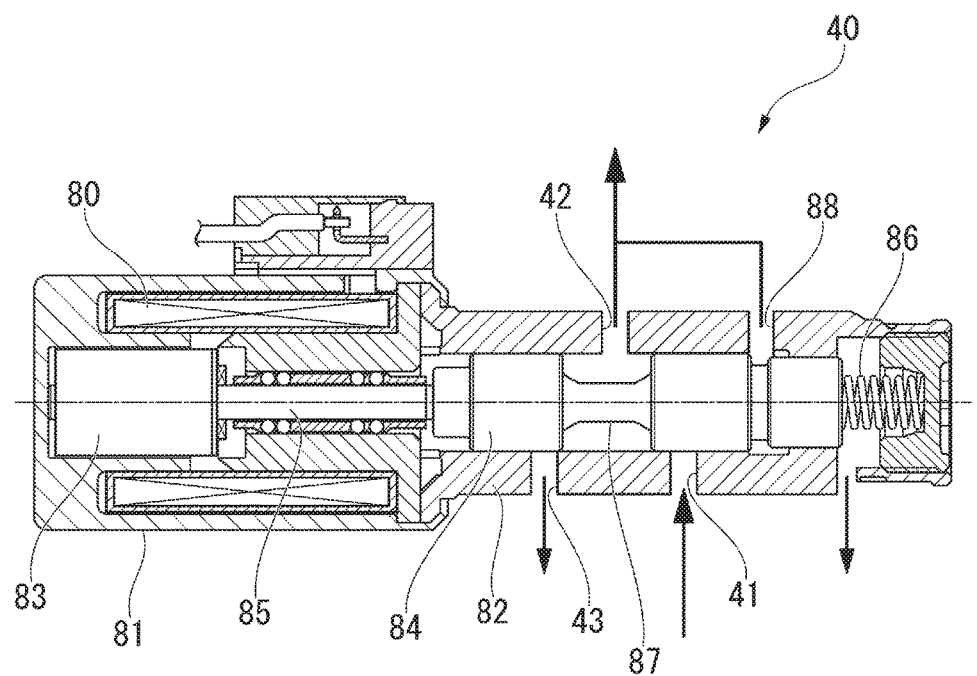
FIG. 16 is a longitudinal cross-sectional view of a hydraulic pressure regulation apparatus built into the power unit according to the embodiment of the present invention.
Figure 17:
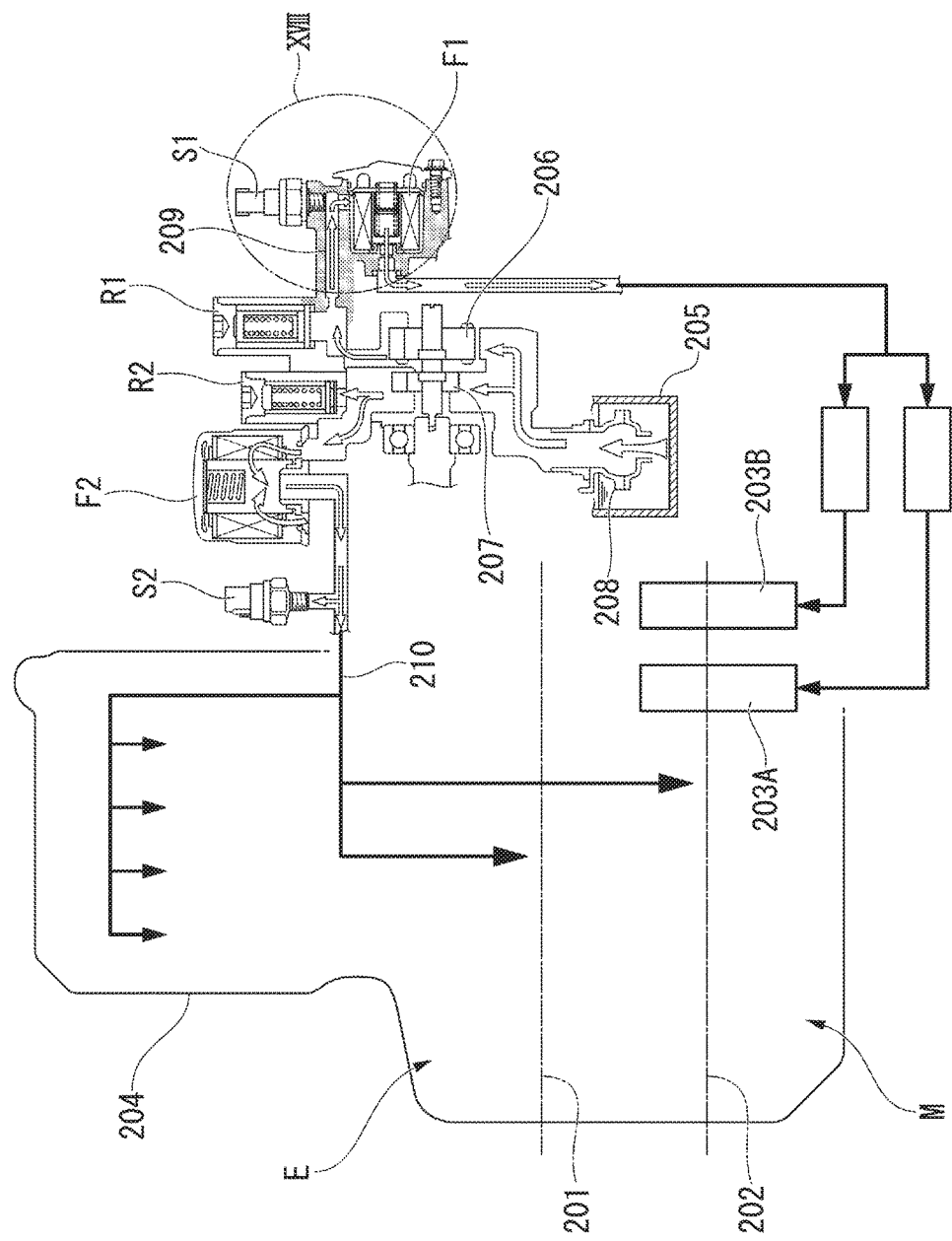
FIG. 17 is a view schematically showing an internal structure of a general power unit.
Figure 18:
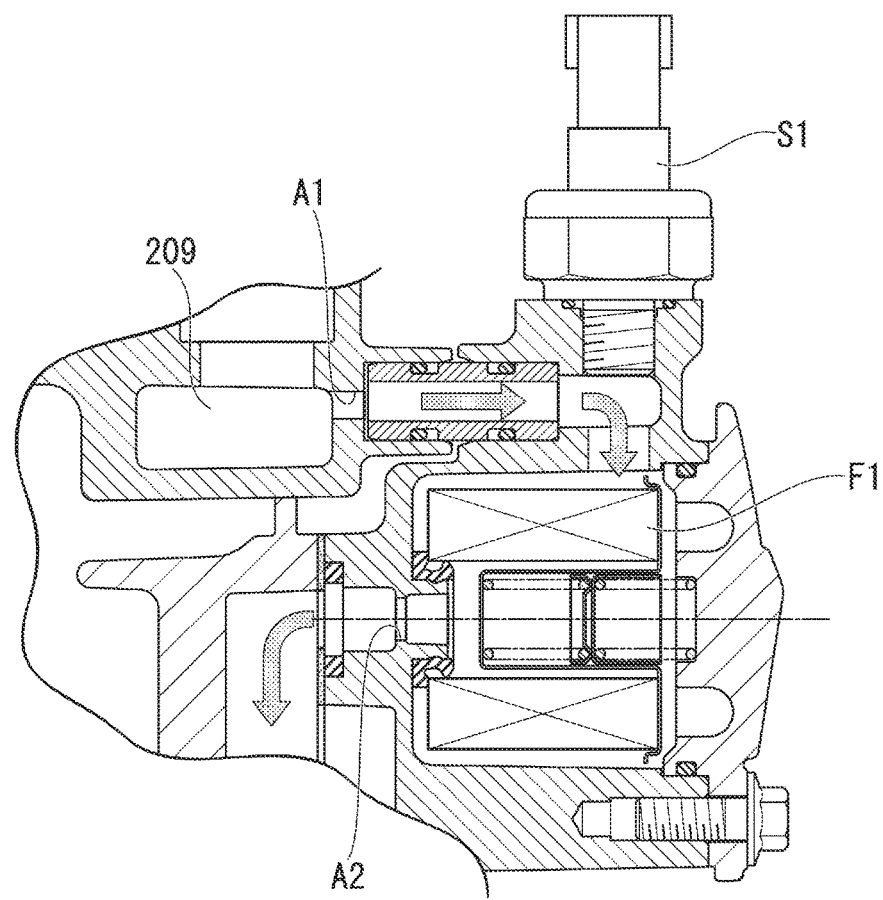
FIG. 18 is an enlarged view showing a portion XVIII of FIG. 17.

FIG. 16 is a cross-sectional view showing a specific structure of the hydraulic pressure regulation apparatus 40 installed in the working oil passage 39 and configured to regulate the pressure of the oil supplied to each of the hydraulic clutches 50A and 50B. Further, while two hydraulic pressure regulation apparatuses 40 are installed to correspond to the hydraulic clutches 50A and 50B, since both of the apparatuses have substantially the same structure, only one apparatus will be described below.

The hydraulic pressure regulation apparatus 40 includes an electromagnetic coil 80 configured to control a flowing current by a controller (not shown), a tubular wall 82 integrally attached to be coaxial with a housing 81 of the electromagnetic coil 80, a movable core 83 movably disposed in an internal space of the electromagnetic coil 80 in the axial direction, a spool valve 84 slidably accommodated inside the tubular wall 82, a connecting rod 85 configured to connect the movable core 83 and the spool valve 84, and a return spring 86 configured to bias the spool valve 84 toward an initial position.

The oil introduction port 41 connected to an upstream side of the working oil passage 39 (the working oil pump 30 side), the control port 42 connected to a downstream side of the working oil passage 39 (the hydraulic clutches 50A, 50 sides), and the drain port 43 configured to return the excessive oil to the working oil storage chamber 33 are installed at the tubular wall 82. An annular groove 87 configured to selectively bring the oil introduction port 41 and the drain port 43 into communication with the control port 42 is formed at an outer periphery of the spool valve 84.

The hydraulic pressure regulation apparatus 40 is basically operated by a balance between a thrust of the electromagnetic coil 80 and a repulsive force of the return spring 86 that are applied to the spool valve 84, and communicates the control port 42 with the drain port 43 when the electromagnetic coil 80 is in an off state. Then, when the electromagnetic coil 80 is excited, the spool valve 84 is displaced in the axial direction, and the oil introduction port 41 is appropriately communicated with the control port 42. The spool valve 84 is displaced to appropriately advance and retreat according to electric conduction control of the electromagnetic coil 80 or a variation in pressure of the hydraulic clutches 50A and 50B side, and thus, controls supplying hydraulic pressure with respect to the hydraulic clutches 50A and 50B. Further, reference numeral 88 in FIG. 16 is a pressure regulation port configured to apply a pressure of the control port 42 to the spool valve 84 in a return direction and control a sensitive variation of the spool valve 84.

Further, the drain port 43 returns the oil to the working oil storage chamber 33 through a returning passage (not shown) in the clutch cover 47 or the rear crank cover 48 and a returning port 89 of the end block 70B shown in FIGS. 6 and 11.

Next, a flow of the oil in the power unit case UC of the power unit PU of present the embodiment will be described with reference to FIG. 7.

During operation of the engine 11, the shared shaft section 20a of the pump unit 20 is rotated by receiving rotation of the crank shaft 15, and thus, the three oil pumps 30, 31 and 32 in the pump unit 20 are rotated and driven.

Accordingly, in the working oil pump 30, the oil suctioned from the inside of the working oil storage chamber 33 via the oil strainer 38 is ejected into the working oil passage 39. In the working oil passage 39, the pressure of the oil supplied into the hydraulic clutches 50A and 50B is appropriately regulated by the hydraulic pressure regulation apparatus 40, and the excessive oil discharged from the drain port 43 is returned to the working oil storage chamber 33 through the returning passage 44. While the oil is supplied to the working oil passage 39 in this way, a decrease in pressure of the oil in the working oil passage 39 is monitored by the hydraulic pressure sensor 46.

Meanwhile, in the lubrication oil pump 31, the oil suctioned from the inside of the lubrication oil storage chamber 34 via the oil strainer 55 is ejected into the lubrication oil passage 56. The oil ejected from the lubrication oil pump 31 is purified while passing through the lubrication oil filter 59, and is then further supplied to the lubrication sections of the engine, the transmission, and so on, through the lubrication oil passage 56. The oil that performed the lubricating of the lubrication sections is returned to the lubrication oil storage chamber 34 again. The oil immediately after passing through the lubrication oil filter 59 in the lubrication oil passage 56 is branched in the transition passage 58, and some of the oil flows into the working oil storage chamber 33 through the transition passage 58. While the oil is supplied into the lubrication oil passage 56 in this way, a decrease in pressure of the oil in the lubrication oil passage 56 is monitored by the low hydraulic pressure switch 57.

In addition, in the scavenging pump 32, the oil suctioned from the inside of the clutch chamber 28 via the oil strainer 61 flows into the lubrication oil storage chamber through the ejection passage 62.

In this way, while the three oil pumps 30, 31 and 32 in the pump unit 20 are rotated and driven, some of the oil ejected into the lubrication oil passage 56 or the working oil passage 39 flows into the working oil storage chamber 33 through the transition passage 58 or the drain port 43 of the hydraulic pressure regulation apparatus 40. In this way, when the oil continuously flows into the working oil storage chamber 33, the oil in the working oil storage chamber 33 passes over the height of the through-hole 37 of the upper wall 36 and flows into the lubrication oil storage chamber 34 through the through-hole 37. While the oil that lubricates parts through the lubrication oil passage 56 is also returned to the lubrication oil storage chamber 34, since the lubrication oil storage chamber 34 has a bottom section area larger than that of the working oil storage chamber 33 and an amount of the oil flowed into the working oil storage chamber 33 is large, a liquid surface of the oil in the working oil storage chamber 33 becomes more easily to maintain at a height higher than that of the liquid surface of the oil in the lubrication oil storage chamber 34.

Accordingly, when an oil amount of the oil in the power unit case UC is reduced, the oil in the lubrication oil passage 56 starts to decrease in pressure earlier than the oil in the working oil passage 39, and the low hydraulic pressure switch 57 in the lubrication oil passage 56 outputs an alarm signal earlier than the hydraulic pressure sensor 46 in the working oil passage 39.

In addition, in the oil system for scavenging, when the scavenging pump 32 is driven together with driving of the engine 11, the oil in the clutch chamber 28 is suctioned into the lower stream path 60b of the suction passage 60 via the oil strainer 61 while receiving a suction force from the suction section of the scavenging pump 32. The oil flowed into the lower stream path 60b rises through the lower stream path 60b and flows into the upstream path 60a beyond the top section 74a of the bent section 74, and is suctioned into the suction section of the scavenging pump 32 via the upstream path 60a. As the suction passage 60 has the bent section 74 bent upward in a protruding shape in the middle of the passage, the oil can easily go over the bent section 74 by the suction force of the pump during driving of the scavenging pump 32, and the oil in the clutch chamber 28 can be suctioned without inconvenience.

Meanwhile, when the driving of the scavenging pump 32 is stopped together with stoppage of the engine 11, a dead weight that hangs downward is applied to the oil in the lower stream path 60b of the suction passage 60, and meanwhile, the oil in the working oil storage chamber 33 intrudes into the scavenging pump 32 via a peripheral region of the shaft section 20a of the pump unit 20. A pressure of the oil that intrudes into the scavenging pump 32 via the peripheral region of the shaft section 20a depends on a difference of elevation between the liquid surface height L of the oil in the working oil storage chamber 33 and the shaft section 20a.

Here, in the case of the suction passage 60 of the present embodiment, the top section 74a of the bent section 74 is formed to be disposed above the liquid surface height L of the oil in the working oil storage chamber 33. For this reason, the oil that intrudes into the scavenging pump 32 via the peripheral region of the shaft section 20 cannot climb over the top section 74a of the bent section 74. Accordingly, the oil does not backflow from the inside of the scavenging pump 32 toward the lower stream path 60b of the suction passage 60 under normal conditions.

As described above, in the oil supply structure of the power unit PU according to the present embodiment, the working oil storage chamber 33 is disposed inside the lubrication oil storage chamber 34, and the oil overflowed from the working oil storage chamber 33 is stored in the lubrication oil storage chamber 34. For this reason, supplementation of the oil can be prompted to the user by outputting an alarm signal early using the low hydraulic pressure switch 57 of the lubrication oil passage 56 side upon a decrease in amount of the oil without requiring difficult setting or tuning of the specification of the throttling section in the working oil passage 39 under conventional conditions.

In addition, the oil supply structure of the power unit PU according to the embodiment has a configuration in which the oil discharged from the drain port 43 of the hydraulic pressure regulation apparatus 40 installed in the working oil passage 39 is returned to the working oil storage chamber 33. For this reason, during normal traveling or the like of the vehicle in which operations of the hydraulic clutches 50A and 50B are not frequently performed, a large amount of oil can be returned to the working oil storage chamber 33 from the drain port 43 of the hydraulic pressure regulation apparatus 40. Accordingly, during the normal traveling of the vehicle, the liquid surface in the working oil storage chamber 33 can be maintained at a high level, and when a decrease in flow rate of the oil occurs, the alarm signal can be reliably output early by the low hydraulic pressure switch 57 of the lubrication oil passage 56 side.

In addition, in the oil supply structure of the present embodiment, the transition passage 58 is formed at the lubrication oil passage 56. For this reason, some of the oil ejected into the lubrication oil passage 56 normally flows into the working oil storage chamber 33 through the transition passage 58. For this reason, the liquid surface in the working oil storage chamber 33 can be maintained at a high level, and upon a decrease in flow rate of the oil, the alarm signal is easily output early by the low hydraulic pressure switch 57 of the lubrication oil passage 56 side.

In particularly, in the oil supply structure according to the present embodiment, the lubrication oil filter 59 is interposed in the middle of the lubrication oil passage 56, and the transition passage 58 is formed downstream from the lubrication oil filter 59. For this reason, the oil can be suppressed from being severely agitated in an inflow section of the oil from the transition passage 58. That is, a pressure variation of a pulsation or the like of the oil ejected from the lubrication oil pump 31 is attenuated by passing through the lubrication oil filter 59. For this reason, when the oil flows into the working oil storage chamber 33 through the transition passage 58, the oil therein is not severely agitated.

In addition, the oil supply structure according to the present embodiment has three oil pumps of the lubrication oil pump 31, the working oil pump 30 and the scavenging pump 32 that share a drive system and are coaxially installed. For this reason, the three oil pumps can be integrated to a compact size. Then, the three oil pumps integrated in this way are disposed in the working oil storage chamber 33, and the suction section of the lubrication oil pump 31 passes through the peripheral wall 35 of the working oil storage chamber 33 to open in the lubrication oil storage chamber 34. For this reason, the oil in the lubrication oil storage chamber 34 can be suctioned by the lubrication oil pump 31 while disposing main parts of the pump unit 20 in the working oil storage chamber 33.

In addition, in the oil supply structure according to the present embodiment, the working oil storage chamber 33 is configured of a space that is substantially closed and having the upper wall 36, and the through-hole 37 configured to overflow the oil is formed in the upper wall (36) of the space. For this reason, even when the power unit PU is inclined during the traveling of the vehicle, the oil in the working oil storage chamber 33 can be prevented from overflowing at a time in advance.

Then, in the oil supply structure, as a shape of the upper wall 36 or a height position of the through-hole 37 formed in the upper wall 36 is appropriately selected, a maximum liquid surface height of the working oil storage chamber 33 can be easily set.

Further, in the oil supply structure according to the present embodiment, when the liquid surface height of the oil in the working oil storage chamber 33 is smaller than a predetermined level, the liquid surface switch 64 configured to emit an alarm signal is installed in the working oil storage chamber 33. For this reason, when a flow rate of the oil in the power unit case UC is decreased, a decrease in flow rate can be detected early by not only the low hydraulic pressure switch 57 in the lubrication oil passage 56 or the hydraulic pressure sensor 46 in the working oil passage 39, but also the detection of a decrease of the liquid surface of the working oil storage chamber 33 by the liquid surface switch 64.

In addition, as described above, in the power unit PU according to the present embodiment, the bent section 74 having the bent top section 74a that is disposed above the liquid surface height L of the oil in the working oil storage chamber 33 is formed at the suction passage 60 connected to the suction section of the scavenging pump 32. For this reason, even when the scavenging pump 32 is stopped for a long time, the oil in the working oil storage chamber 33 can be prevented from backflowing into the clutch chamber 28 via the peripheral region of the shaft section 20a of the pump unit 20 and the suction passage 60.

Further, in the present embodiment, the oil in the clutch chamber 28 of the power unit PU flows into the lubrication oil storage chamber 34 by the scavenging pump 32. However, the low liquid surface chamber configured to suction the oil by the scavenging pump 32 may not necessarily be the clutch chamber 28, and the scavenging pump 32 can also be applied to a space except for the clutch chamber 28 as long as the low liquid surface chamber is a space section in which a liquid surface of the oil is to be decreased.

However, the power unit PU according to the present embodiment can suction the oil in the clutch chamber 28 into the lubrication oil storage chamber 34 using the scavenging pump 32 to maintain the liquid surface of the oil in the clutch chamber 28 at a low level. For this reason, an increase in rotational resistance by the oil upon rotation or operation of the hydraulic clutches 50A and 50B can be suppressed.

In particular, in the power unit PU of the present embodiment, the liquid surface of the oil in the clutch chamber 28 can be described as at a low level as described above even upon stoppage of the driving of the scavenging pump 32. For this reason, oil intrusion of the hydraulic clutches 50A and 50B upon the starting of the engine can be significantly suppressed, and startability of the engine 11 can be increased.

Further, in the power unit PU according to the embodiment, the scavenging pump 32 shares the shaft section 20a with the working oil pump 30 or the lubrication oil pump 31, and is installed in the working oil storage chamber 33 as the integrated oil unit 20. For this reason, the scavenging pump 32 can be compactly disposed in the working oil storage chamber 33 together with the working oil pump 30 or the lubrication oil pump 31. Accordingly, miniaturization of the power unit PU can be easily achieved.

In addition, the power unit PU of the embodiment is configured of a passage through which the oil flows into the lubrication oil storage chamber 34 separate from the working oil storage chamber 33 without the oil suctioned from the clutch chamber 28 by the scavenging pump 32 not being directly flowed into the working oil storage chamber 33. For this reason, the oil in the working oil storage chamber 33 can be prevented from being agitated by the oil ejected from the scavenging pump 32 in advance.

That is, the oil ejected from the scavenging pump 32 is taken from a low portion of a liquid surface level in the clutch chamber 28. For this reason, the probability of severely agitating the oil in the ejection section by involution or the like of air is considered. On the other hand, in the power unit PU according to the present embodiment, since the oil ejected from the scavenging pump 32 does not directly flow into the working oil storage chamber 33, agitation of the oil in the working oil storage chamber 33 can be prevented in advance.

In addition, in the power unit PU of the embodiment, since the working oil storage chamber 33 partitioned by the rear partition wall 26 (the main partition wall) and the peripheral wall 27 (the subsidiary partition wall) is formed in the left case half 12L of the crank case 12 and the opening 66 configured to come into communication with the inside of the working oil storage chamber 33 and allow insertion of the main part of the pump unit 20 is formed in the rear partition wall 26, the left case half 12L of the crank case 12 integrally having the working oil storage chamber 33 can be easily formed through casting.

That is, when the left case half 12L is manufactured, for example, as casting of the left case half 12L is performed using a surface along the rear partition wall 26 as a dividing surface, a protruding mold that forms a recess space of the working oil storage chamber 33 can be easily extracted through a portion corresponding to the opening 66 of the rear partition wall 26 upon division of a mold.

Accordingly, as the configuration is employed, reduction in manufacturing cost of the crank case 12 can be achieved.

In addition, in the case of the power unit PU of the present embodiment, it is advantageous that, in a state in which the main part of the pump unit 20 is inserted into the working oil storage chamber 33 through the opening of the left case half 12L, as the end block 70B of the pump unit 20 is coupled to the peripheral edge section of the opening 66, an installation work of the pump unit 20 is eased because the main part of the pump unit 20 can be installed in the working oil storage chamber 33.

Figure 19:
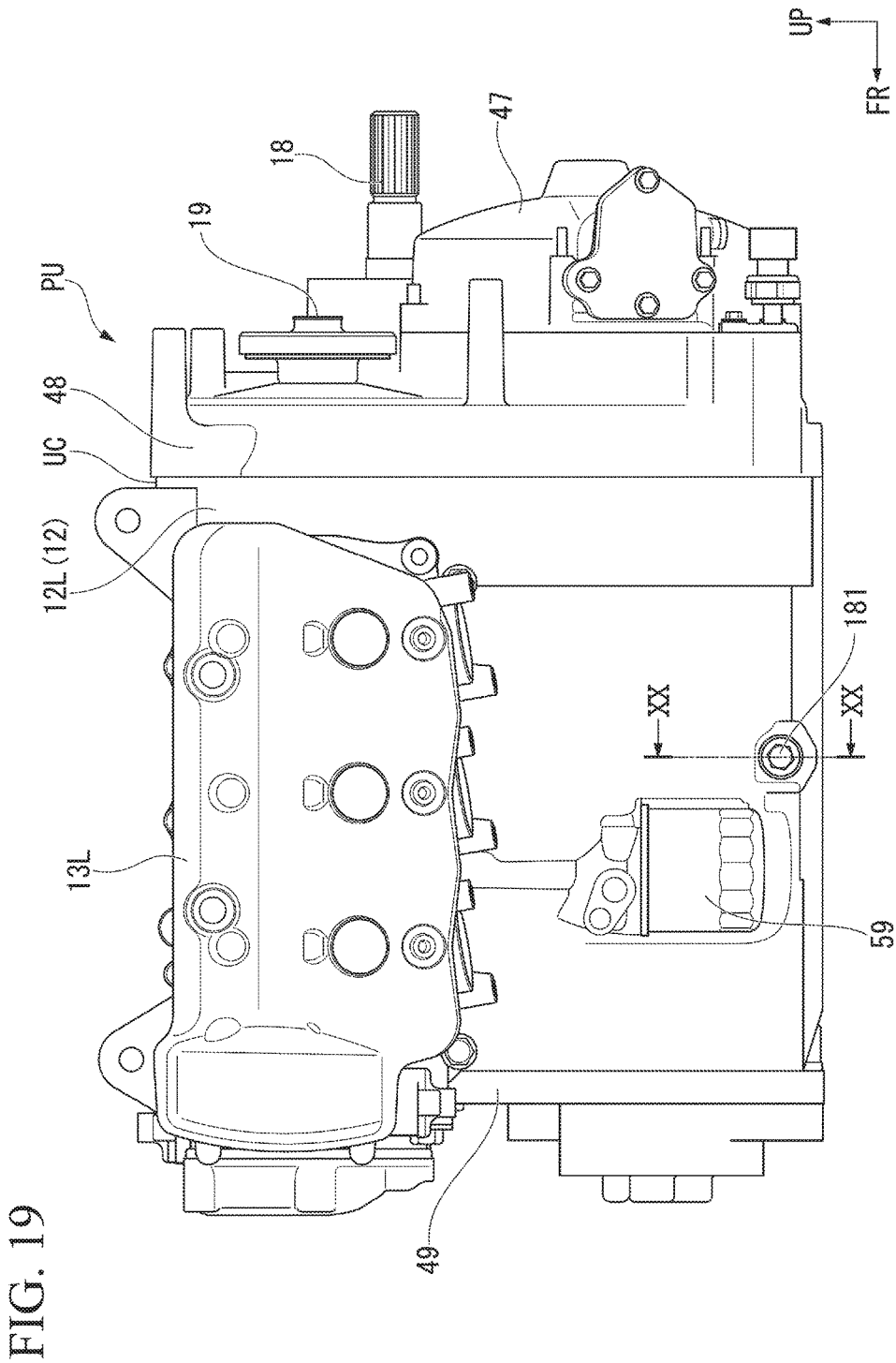
FIG. 19 is a left side view of a power unit according to another embodiment of the present invention at which a drain bolt is installed.
Figure 20:
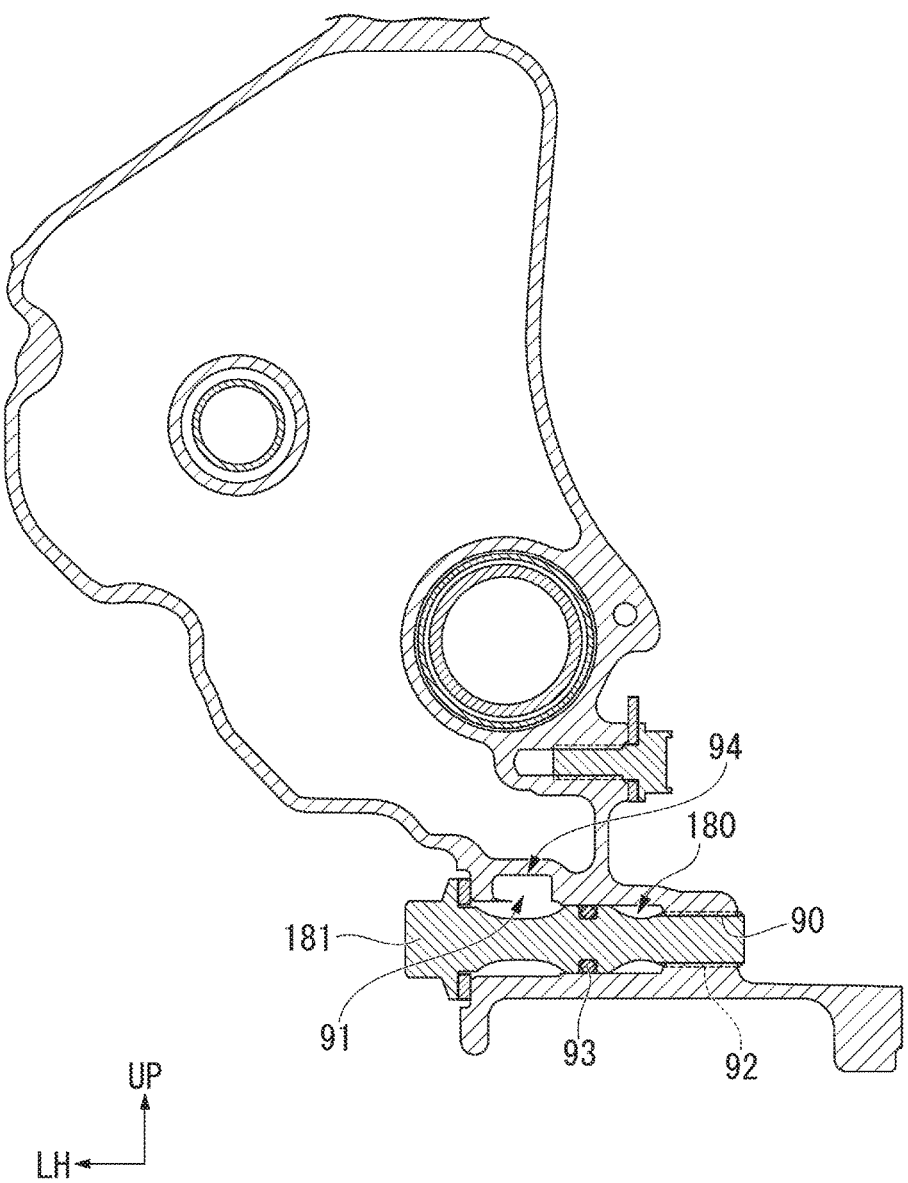
FIG. 20 is a cross-sectional view corresponding to a cross section taken along line XX-XX of FIG. 19 of the power unit according to the other embodiment of the present invention.

In addition, in the above-mentioned embodiment, as shown in FIGS. 19 and 20, the power unit PU may be configured to further include a through-hole 180 configured to pass through the working oil storage chamber 33 and the lubrication oil storage chamber 34 in a direction in which the working oil storage chamber 33 and the lubrication oil storage chamber 34 are disposed in parallel, and a single drain bolt 181 configured to close the through-hole 180. Further, FIG. 20 is a cross-sectional view corresponding to a cross section taken along line XX-XX of FIG. 19.

As the above-mentioned configuration is used, both of the working oil storage chamber 33 and the lubrication oil storage chamber 34 can be closed by the single drain bolt 181. That is, as the above-mentioned configuration is employed, both of the working oil storage chamber 33 and the lubrication oil storage chamber 34 can be shut by the single drain bolt 181. In addition, as the drain bolt 181 is removed, the oil can be simultaneously discharged from both of the working oil storage chamber 33 and the lubrication oil storage chamber 34.

Further, a female screw section 90 formed at the lubrication oil storage chamber 34 side and a communication section 91 passing through the working oil storage chamber 33 at a position closer to a bolt head side of the drain bolt 181 than the female screw section 90 may be formed around the through-hole 180. In addition, the drain bolt 181 may be configured to have a male screw section 92 threadedly engaged with the female screw section 90, and an O-ring 93 disposed between the male screw section 92 and the communication section 91. The communication section 91 brings the oil of the working oil storage chamber 33 into communication with a side portion of the drain bolt 181. In addition, the O-ring seals the oil between the working oil storage chamber 33 and the lubrication oil storage chamber 34.

As the above-mentioned configuration is used, even in a simple configuration in which a complex configuration is not needed, the working oil storage chamber 33 and the lubrication oil storage chamber 34 can be sealed. Further, as the drain bolt 181 is removed, the oil can be discharged from both of the working oil storage chamber 33 and the lubrication oil storage chamber 34.

Figure 21:
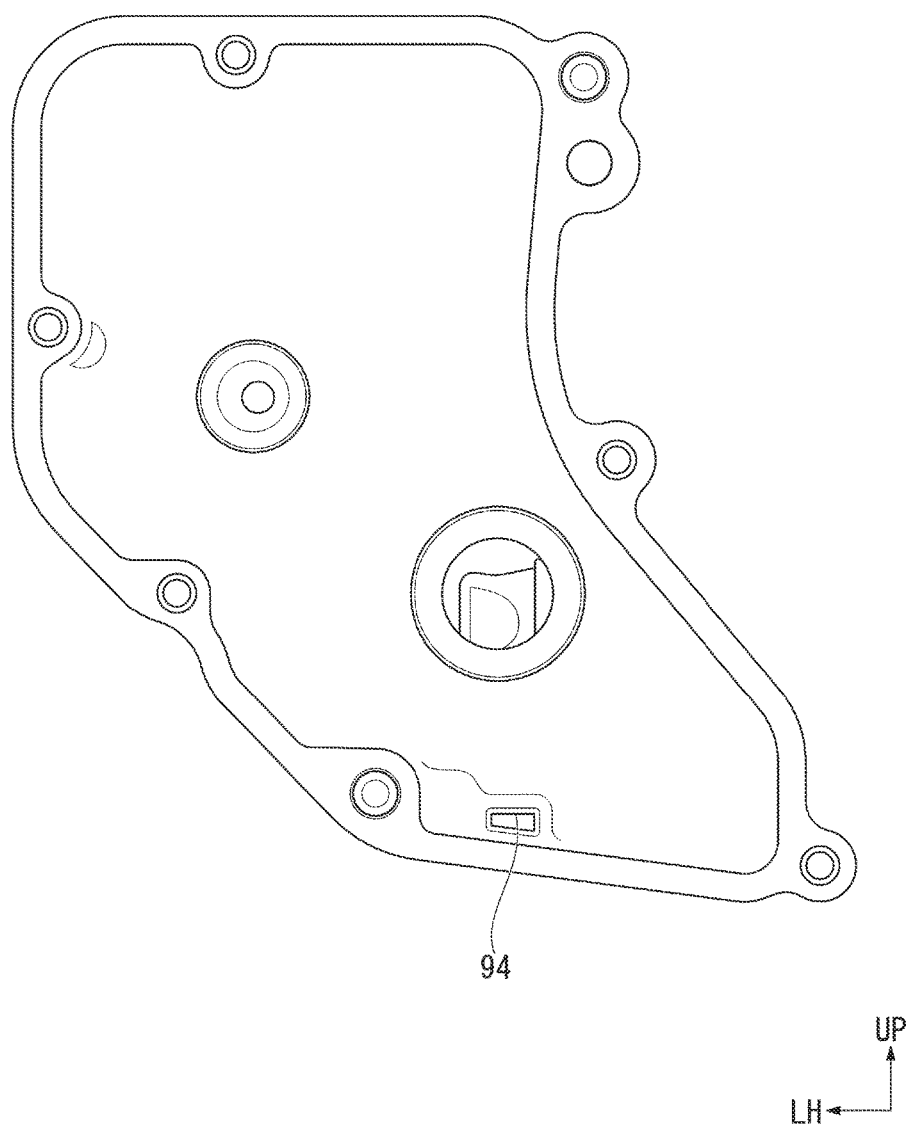
FIG. 21 is a back view of a working oil storage chamber in the power unit according to the other embodiment of the present invention.

In addition, in the above-mentioned present embodiment, as shown in FIGS. 20 and 21, a hood section 94 may be formed at an upper portion of the through-hole 180. A space formed by providing the hood section 94 is configured to communicate with the working oil storage chamber 33.

Further, the present invention is not limited to the above-mentioned embodiment, but various design changes may be made without departing from the scope of the present invention. For example, the engine 11 built into the power unit PU is not limited to a horizontal facing type but may be a multi-cylinder engine of another type such as a parallel type, a V type, or the like, or a single cylinder engine. In addition, the engine 11 is not limited to a vertical engine in which the crank shaft 15 is provided in the vehicle forward and rearward directions but may be a horizontal engine in which a crank shaft is provided in the vehicle left and right directions.

In addition, the vehicle to which the present invention is applied is not limited to the motorcycle (including a motorized bicycle and a scooter type vehicle) but may also include a three-wheeled small vehicle (including a front two-wheeled and rear single wheeled vehicle, in addition to the front single wheeled and rear two-wheeled vehicle) or a four-wheeled small vehicle.

Further, the above-mentioned embodiments may be appropriately combined. In addition, several components may not be used.

REFERENCE SIGNS LIST

11 Engine
12L Left case half (case part)
15 Crank shaft
20 Pump unit
20a Shaft section
25 Transmission
26 Rear partition wall (main partition wall)
27 Peripheral wall (subsidiary partition wall)
28 Clutch chamber (low liquid surface chamber)
29 Oil storage section
30 Working oil pump
31 Lubrication oil pump
32 Scavenging pump
33 Working oil storage chamber
34 Lubrication oil storage chamber (separate oil storage chamber)
35 Peripheral wall (wall)
36 Upper wall
37 Through-hole
39 Working oil passage
40 Hydraulic pressure regulation apparatus
41 Oil introduction port
42 Control port
43 Drain port
46 Hydraulic pressure sensor (working oil pressure detection part)
50A, 50B Hydraulic clutch
56 Lubrication oil passage
57 Low hydraulic pressure switch (lubrication hydraulic pressure detection part)
58 Transition passage
59 Lubrication oil filter
60 Suction passage
61 Oil strainer (suction port)
64 Liquid surface switch
66 Opening
74 Bent section
70B End block (end wall)
90 Female screw section
91 Communication section
92 Male screw section
93 O-ring
94 Hood section
180 Through-hole
181 Drain bolt
PU Power unit
UC Power unit case

The invention claimed is:

1. An oil supply structure for a power unit comprising:
an engine;
a transmission configured to change an output of the engine;
a hydraulic clutch interposed between the engine and the transmission, and configured to cut off and connect power between the engine and the transmission;
a working oil passage configured to supply oil into the hydraulic clutch;
a working oil pump configured to pump oil into the working oil passage;
a lubrication oil passage configured to lubricate movable parts in a power unit case;
a lubrication oil pump configured to pump oil into the lubrication oil passage;
an oil storage section configured to store oil returned from the working oil passage and the lubrication oil passage and pumped from the working oil pump and the lubrication oil pump;
a working oil pressure detection part configured to detect a decrease in pressure of the oil in the working oil passage to a predetermined value or less and output an alarm signal; and
a lubrication hydraulic pressure detection part configured to detect a decrease in pressure of the oil in the lubrication oil passage to a predetermined value or less and output an alarm signal,
wherein the oil storage section comprises a lubrication oil storage chamber in which a suction section of the lubrication oil pump is opened, and a working oil storage chamber in which a suction section of the working oil pump is opened, and
wherein oil overflowed from the working oil storage chamber is stored in the lubrication oil storage chamber.

2. The oil supply structure for a power unit according to claim 1,
wherein a hydraulic pressure regulation apparatus configured to regulate a pressure of oil supplied to the hydraulic clutch is interposed in the working oil passage,
wherein the hydraulic pressure regulation apparatus has an oil introduction port into which the oil pumped from the working oil pump is introduced, a control port configured to supply the oil regulated to a set hydraulic pressure to the hydraulic clutch, and a drain port configured to discharge excessive oil introduced into the oil introduction port, and wherein the oil discharged from the drain port is returned to the working oil storage chamber.

3. The oil supply structure for a power unit according to claim 1,
wherein a transition passage configured to cause some of the oil supplied into the lubrication oil passage from the lubrication oil pump to flow into the working oil storage chamber is formed at the lubrication oil passage.

4. The oil supply structure for a power unit according to claim 3,
wherein a lubrication oil filter configured to purify oil is interposed in a middle of the lubrication oil passage, and
wherein the transition passage is provided downstream from the lubrication oil filter of the lubrication oil passage.

5. The oil supply structure for a power unit according to claim 1,
wherein the lubrication oil pump and the working oil pump share a driving system and are coaxially provided in the working oil storage chamber, and
wherein the suction section of the lubrication oil pump passes through a wall of the working oil storage chamber to be opened in the lubrication oil storage chamber.

6. The oil supply structure for a power unit according to claim 1,
wherein the working oil storage chamber is configured of a space that is substantially closed and having an upper wall, and
wherein a through-hole through which the oil filled in the working oil storage chamber overflows into the lubrication oil storage chamber is formed in the upper wall of the working oil storage chamber.

7. The oil supply structure for a power unit according to claim 1,
wherein a liquid surface switch configured to emit an alarm signal when a liquid surface height of the oil in the working oil storage chamber becomes lower than a predetermined level is installed in the working oil storage chamber.

8. The oil supply structure for a power unit according to claim 1, further comprising:
a low liquid surface chamber installed to be partitioned with the oil storage section in the power unit case;
a scavenging pump disposed in the oil storage section and configured to suction oil in the low liquid surface chamber into a separate portion in the power unit case; and
a suction passage having a suction port disposed at a first end side of the suction passage and opened in the low liquid surface chamber, and a second end of the suction passage connected to a suction section of the scavenging pump,
wherein a shaft section of the scavenging pump is disposed at a position higher than the suction port of the suction passage and lower than a liquid surface height of oil in contact with an inside of the oil storage section, and
wherein the suction passage has a bent section disposed above a liquid surface height of the oil in the oil storage section, the suction port is formed at a first end side of the bent section, and the suction section of the scavenging pump is connected to a second end side of the bent section.

9. The oil supply structure for a power unit according to claim 8,
wherein the hydraulic clutch is disposed at a lower side region in the power unit case under a crank shaft of the engine, and a clutch chamber is disposed in a space of a rear section of a crank case sandwiched between a rear partition wall and a rear crank cover, wherein the rear partition wall of the rear section of the crank case partitions the inside of the power unit case into the oil storage section and the clutch chamber, and
wherein the clutch chamber is the low liquid surface chamber.

10. The oil supply structure for a power unit according to claim 9,
wherein the working oil storage chamber stores oil to operate the hydraulic clutch,
wherein the lubrication oil storage chamber is an oil storage chamber different from the working oil storage chamber,
wherein the scavenging pump and the working oil pump configured to pump oil to operate the hydraulic clutch share a driving system and are coaxially provided in the working oil storage chamber, and
wherein the scavenging pump causes the oil suctioned from the inside of the clutch chamber to flow into the lubrication oil storage chamber.

11. The oil supply structure for a power unit according to claim 10,
wherein the lubrication oil pump lubricates movable parts in the power unit case,
wherein the scavenging pump, the working oil pump and the lubrication oil pump share a driving system to be configured as an integrated pump unit, and an end wall is provided at a first end side in an axial direction of the pump unit,
wherein a main partition wall configured to partition the inside of the power unit case into the clutch chamber and the oil storage section and a subsidiary partition wall configured to partition the inside of the oil storage section into the working oil storage chamber and the separate oil storage chamber are formed at a case part that configures the power unit case,
wherein an opening in communication with the inside of the working oil storage chamber is formed in the main partition wall, and
wherein a main part of the pump unit is inserted into the working oil storage chamber from a second end side of the pump unit, and the end wall of the pump unit is coupled to a peripheral edge section of the opening.

12. The oil supply structure for a power unit according to claim 1, further comprising:
a through-hole which passes through the working oil storage chamber and the lubrication oil storage chamber in a direction in which the working oil storage chamber and the lubrication oil storage chamber are disposed in parallel; and
a single drain bolt configured to close the through-hole.

13. The oil supply structure for a power unit according to claim 12,
wherein a female screw section formed at the lubrication oil storage chamber side and a communication section in communication with the working oil storage chamber at a position closer to a bolt head side than the female screw section are formed at a periphery of the through-hole, and
wherein the drain bolt has a male screw section configured to be threadedly engaged with the female screw section and an O-ring configured to be disposed between the male screw section and the communication section.

* * * * *